(12) United States Patent
Noguchi

(10) Patent No.: US 7,265,781 B2
(45) Date of Patent: Sep. 4, 2007

(54) METHOD AND APPARATUS FOR DETERMINING A COLOR CORRECTION MATRIX BY MINIMIZING A COLOR DIFFERENCE MAXIMUM OR AVERAGE VALUE

(75) Inventor: Takafumi Noguchi, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 669 days.

(21) Appl. No.: 10/225,537

(22) Filed: Aug. 22, 2002

(65) Prior Publication Data

US 2003/0098916 A1   May 29, 2003

(30) Foreign Application Priority Data

| Aug. 22, 2001 | (JP) | ............................. 2001-251266 |
| Aug. 22, 2001 | (JP) | ............................. 2001-251355 |
| Dec. 12, 2001 | (JP) | ............................. 2001-379113 |
| Dec. 13, 2001 | (JP) | ............................. 2001-379630 |

(51) Int. Cl.
H04N 5/228 (2006.01)
H04N 9/73 (2006.01)
G06K 9/00 (2006.01)
G06K 15/00 (2006.01)

(52) U.S. Cl. ................. 348/223.1; 348/188; 348/222.1; 382/167; 358/518

(58) Field of Classification Search ................. 348/187, 348/188, 222.1, 223.1; 382/162, 167; 358/519–523, 358/475, 520

See application file for complete search history.

(56) References Cited

U.S. PATENT DOCUMENTS

| 5,099,313 | A | | 3/1992 | Suemoto et al. |
| 5,668,596 | A | * | 9/1997 | Vogel ....................... 348/222.1 |
| 5,805,213 | A | * | 9/1998 | Spaulding et al. ....... 348/222.1 |
| 6,061,522 | A | * | 5/2000 | Inoue et al. ................... 396/28 |
| 6,075,563 | A | | 6/2000 | Hung |
| 6,373,531 | B1 | | 4/2002 | Hidaka et al. |
| 6,515,275 | B1 | * | 2/2003 | Hunter et al. ............... 250/226 |
| 6,549,653 | B1 | * | 4/2003 | Osawa et al. ............... 382/162 |
| 6,650,438 | B1 | * | 11/2003 | Kress et al. .................. 358/1.9 |
| 6,864,915 | B1 | * | 3/2005 | Guimaraes et al. ...... 348/222.1 |

FOREIGN PATENT DOCUMENTS

| JP | 2-29095 A | 1/1990 |
| JP | 9-102882 A | 4/1997 |
| JP | 10-4558 A | 1/1998 |
| JP | 11-113005 A | 4/1999 |

* cited by examiner

*Primary Examiner*—Ngoc-Yen Vu
*Assistant Examiner*—Dan Pasiewicz
(74) *Attorney, Agent, or Firm*—Sughrue Mion, PLLC

(57) ABSTRACT

Color correction matrix determining method and apparatus and image photographing method and apparatus are used in a color processing system that converts input image data into output image data and has two color correction matrixes that are a first matrix and a second matrix, with a white balance correction circuit being sandwiched between the first matrix and the second matrix. The color correction matrix determining method and apparatus input a light source range and determines the first matrix based on this inputted light source range on the occasion of determining the color correction matrix in the color processing system. The image photographing method and apparatus discriminates a photographing light source range and determines the first matrix based on the discriminated photographing light source range.

20 Claims, 9 Drawing Sheets

——— ORIGINAL
------- OPTIMIZED

METHOD AND APPARATUS FOR DETERMINING A COLOR CORRECTION MATRIX BY MINIMIZING A COLOR DIFFERENCE MAXIMUM OR AVERAGE VALUE

BACKGROUND OF THE INVENTION

1. Field of the Invention

The present invention relates to color correction matrix determining method and apparatus and image photographing method and apparatus using the color correction matrix determining method and apparatus. In particular, the present invention relates to a correction matrix determining method and apparatus that determine a color correction matrix used to perform image conversion in a color image photographing system such as a digital camera. The present invention also relates to image photographing method and apparatus that improve light source dependency in a color processing system of the image photographing apparatus that converts input image data, such as image data obtained through photographing with a CCD, into output image data such as image data for display on a monitor.

2. Description of the Related Art

In usual cases, in a color image photographing system such as a digital camera, a scene to be photographed is photoelectrically read by an image sensor such as a CCD sensor, and a photographed color image is displayed on a monitor such as a liquid crystal display.

In this manner, the digital camera ultimately outputs an output image as an RGB signal for monitor output or as a luminance color difference signal (YCC) by performing JPEG compression. In the case where the output image is outputted as an RGB signal for monitor output, the RGB signal that should be outputted is determined by specifications. However, there are various kinds of CCDs that are usable in a digital camera, so that it is required to perform image conversion from an RGB signal of the CCD into an RGC signal for a monitor An example construction of a color processing system of a conventional digital camera is shown in FIG. 9.

In the color processing system of the digital camera shown in FIG. 9, two color correction matrixes that are a first matrix (linear matrix L-MTX) 92 and a second matrix (chroma matrix C-MTX) 98 are arranged so that a white balance circuit 94 and a γ circuit 96 that respectively perform white balance correction and γ correction on image data read from a CCD 90 are sandwiched therebetween.

As described above, in the color processing system of the conventional digital camera shown in FIG. 9, there are provided the two color correction matrixes. The first matrix (L-MTX) 92 is applied to image data (RGB signal) from the CCD 90 in order to perform the white balance correction and the γ correction. Following this, the image data is processed again using the second matrix (C-MTX) 98, thereby converting the RGB signal of the CCD 90 into an RGB signal under the BT709 that is a recommended standard for HDTVs and has been stipulated by ITU-R (International Telecommunication Union-Radio Communication Sector). Here, the white balance correction for removing a color tint of a photographing light source is generally realized by gain adjustment on a specific color space.

The white balance correction through the gain adjustment gives an appropriate result in many cases, although it is impossible to completely remove the color tint of the light source depending on the kind of the light source. This results in various problems. For instance, in the case of a skin tone photographed under a fluorescent lamp, there remains a cyan-green tint even after the white balance correction is performed, so that it is impossible to reproduce a color like the skin color observed under sunshine. This phenomenon is called the "light source dependency".

In the color processing system of the conventional digital camera shown in FIG. 9 that uses the two color correction matrixes that are the L-MTX 92 and the C-MTX 98, these color correction matrixes are not produced by sufficiently giving attention to such light source dependency, so that there remains a problem in that the light source dependency of the conventional digital camera is not sufficiently improved.

It should be noted here that there is a conventional digital camera that uses only one color correction matrix that is, for instance, the second matrix (C-MTX) 98. In a color processing system of such a digital camera, there is also a problem in that its light source dependency is not sufficiently improved.

That is, there is a problem in that there has conventionally been known no special technique of improving the light source dependency described above.

Also, in the color processing system of the digital camera shown in FIG. 9, there are provided the two color correction matrixes (the first matrix (L-MTX 92) and the second matrix (C-MTX 98)). The characteristic is uniquely determined in the case where these two matrixes are both applied, although it is possible to arbitrarily determine each matrix.

However, it has conventionally been uncertain which role is played by each of the matrixes L-MTX 92 and C-MTX 98. Consequently, there is a problem in that there is not fully utilized a characteristic of the construction where two color correction matrixes are provided in the manner described above.

SUMMARY OF THE INVENTION

The present invention has been made in the light of the aforementioned conventional problems, and a first object of the present invention is to provide color correction matrix determining method and apparatus that are used in a color processing system, in which two color correction matrixes that are a first matrix and a second matrix are provided so that a white balance correction circuit is sandwiched therebetween, and are used to convert image data photographed using a CCD into image data for monitor output that is performed, for instance, in a digital camera. The color correction matrix determining method and apparatus are capable of resolving light source dependency of the second matrix by properly determining the first matrix through the utilization of the characteristic of a construction where two color correction matrixes are provided.

Also, the present invention has been made in the light of the aforementioned conventional problems, and a second object of the present invention is to provide image photographing method and apparatus where, in a color processing system that has at least two color correction matrixes so that a white balance correction circuit is sandwiched between the color correction matrixes, and converts image data obtained through photographing with a CCD into image data for monitor output in a color image photographing apparatus such as a digital camera, it is possible to improve the light source dependency and to obtain an image for which white balance correction and color correction have been appropriately performed without being affected by the kind of a light source.

In order to achieve the first and second objects described above, the inventor of the present invention has obtained the following finding as a result of the earnest repetitive studying on the light source dependency of an image photographing apparatus such as a digital camera.

First, tristimulus values X, Y, and Z obtained under a reference light source $P_0$ ($\lambda$) are approximated in a manner expressed by Expression (1) given below through the linear coupling of an imaging system exposure amount obtained under a photographing light source P ($\lambda$).

$$\underbrace{\begin{aligned}\frac{X}{X_0} &= \frac{(P_0 h, \bar{x})}{(P_0, \bar{x})} \\ \frac{Y}{Y_0} &= \frac{(P_0 h, \bar{y})}{(P_0, \bar{y})} \\ \frac{Z}{Z_0} &= \frac{(P_0 h, \bar{z})}{(P_0, \bar{z})}\end{aligned}}_{\text{Color reproduction target}} \approx \underbrace{\begin{aligned}&\frac{C_{11}(Ph, r)}{(P, r)} + \frac{C_{12}(Ph, g)}{(P, g)} + \frac{C_{13}(Ph, b)}{(P, b)} \\ &\frac{C_{21}(Ph, r)}{(P, r)} + \frac{C_{22}(Ph, g)}{(P, g)} + \frac{C_{23}(Ph, b)}{(P, b)} \\ &\frac{C_{31}(Ph, r)}{(P, r)} + \frac{C_{32}(Ph, g)}{(P, g)} + \frac{C_{33}(Ph, b)}{(P, b)}\end{aligned}}_{\text{Approximation by actual data}} \quad (1)$$

Here, it is assumed that in Expression (1), the sign "(u, v)" represents an inner product "$(u, v) = \int u(\lambda) v(\lambda) d\lambda$" and the sign "uv ($\lambda$)" represents a spectral product "uv ($\lambda$)=u ($\lambda$) v ($\lambda$)". Also, the bars (–) above x, y, and z represent color matching functions, the coefficient $C_{ij}$ (i, j=1 to 3) is a coefficient of the C-MTX 98, and h ($\lambda$) is the spectral reflection factor of a subject. Also, photographing system spectral sensitivity r ($\lambda$), g ($\lambda$), and b ($\lambda$) are stipulated by Expressions (2) to (4) given below using CCD spectral sensitivity R ($\lambda$), G ($\lambda$), and B ($\lambda$) and the coefficient $L_{ij}$ of the L-MTX 92.

$$r(\lambda) = L_{11} \cdot R(\lambda) + L_{12} \cdot G(\lambda) + L_{13} \cdot B(\lambda) \quad (2)$$

$$g(\lambda) = L_{21} \cdot R(\lambda) + L_{22} \cdot G(\lambda) + L_{23} \cdot B(\lambda) \quad (3)$$

$$b(\lambda) = L_{31} \cdot R(\lambda) + L_{32} \cdot G(\lambda) + L_{33} \cdot B(\lambda) \quad (4)$$

Also, as the CCD 90 in the color processing system of the digital camera shown in FIG. 9, there will be considered two systems that each use one of a CCD of type 1 having spectral sensitivity expressed by a graph drawn by a solid line denoted as "ORIGINAL" in FIG. 5A and a CCD of type 2 having spectral sensitivity expressed by a graph drawn by a solid line denoted as "ORIGINAL" in FIG. 5B.

In each case of the types 1 and 2, the L-MTX 92 is regarded as a unit matrix, a light source A (tungsten) and reference light sources D55 and F4 (fluorescent lamp) are used as light sources, and a subject is photographed as an NCS chart. Table 1 shows results of optimization of the C-MTX 98 with reference to each light source using Expression (1) described above. Note that, in the case where L-MTX 92 is regarded as the unit matrix, it becomes possible to make consideration by including the case of a conventional digital camera having only one color correction matrix that is the C-MTX 98.

TABLE 1

| Light source | Type 1 | | | Type 2 | | |
|---|---|---|---|---|---|---|
| A | 0.11 | 0.86 | 0.03 | 0.75 | 0.16 | 0.09 |
|   | −0.44 | 1.58 | −0.14 | 0.32 | 0.79 | −0.11 |
|   | 0.23 | −0.69 | 1.46 | −0.07 | −0.26 | 1.33 |
| D55 | 0.41 | 0.65 | −0.06 | 0.99 | 0.00 | 0.01 |
|   | 0.02 | 1.27 | −0.29 | 0.50 | 0.72 | −0.21 |
|   | 0.07 | −0.32 | 1.24 | −0.00 | −0.15 | 1.15 |
| F4 | 0.57 | 0.28 | 0.15 | 0.91 | −0.06 | 0.15 |
|   | 0.06 | 0.89 | 0.05 | 0.27 | 0.70 | 0.03 |
|   | 0.02 | −0.20 | 1.18 | −0.07 | −0.01 | 1.08 |

As shown in Table 1, in each case of the type 1 and type 2, the C-MTX 98 is changed depending on which light source is used, that is, which one of light sources D55 and F4 is used, and it can be understood that the C-MTX 98 has strong light source dependency. Therefore, it can be understood that, in order to completely eliminate the light source dependency of a digital camera, it is required to perform switching of the C-MTX for each light source by obtaining information concerning a light source applied to photographing.

In an actual device, however, it is impossible to perform the switching of the C-MTX for each photographing light source when attention is paid to cost. Consequently, a C-MTX optimized with reference to a reference light source (D55, for instance) is applied to all light sources in a fixed manner and this fixation of the C-MTX becomes a cause of the light source dependency of the digital camera. In other words, this means that it is possible to suppress the light source dependency to a small degree if there is selected a color space in which the variation of the C-MTX in accordance with the changing of a light source is small.

In view of this fact, the inventor of the present invention has made the present invention based on a finding that it becomes possible to resolve the light source dependency by selecting a color space, in which the variation of the C-MTX in accordance with the changing of a light source is small, through the appropriate selection of an L-MTX. This effect is achieved by a fact that the C-MTX is determined by determining the coefficient $C_{ij}$ so that an approximate expression of Expression (1) described above is well satisfied, although, in an actual device, a C-MTX optimized with reference to a reference light source using Expression (1) described above is applied to every light source in a fixed manner and this fixation of the C-MTX becomes a cause of the light source dependency.

That is, to solve the above-described first problem, according to a first aspect of the present invention, there is provided a color correction matrix determining method for determining a color correction matrix in a color processing system that converts input image data into output image data and includes two color correction matrixes that are a first matrix and a second matrix, with a white balance correction circuit being sandwiched between said first matrix and said second matrix, said color correction matrix determining method comprising:

inputting a light source range; and determining the first matrix based on said inputted light source range.

Here, it is preferable that said first matrix is determined so that a maximum value among respective average color differences for light sources within said inputted light source range is minimized.

Also, it is preferable that said first matrix is determined so that an average value of respective average color differences for light sources within said inputted light source range is minimized.

Also, it is preferable that, when said first matrix is referred to as $\{L_{ij} (i, j=1 \text{ to } 3)\}$, a reference light source within said inputted light source range is referred to as $P_0$, one light source different from said reference light source within said light source range is referred to as $P_k$ (k represents a kind of light source), and each of r ($\lambda$), g ($\lambda$), and b ($\lambda$) represents effective input spectral sensitivity stipulated by the following expressions from input spectral sensitivity R ($\lambda$), G ($\lambda$), and B ($\lambda$) of said input image data and said first matrix $\{L_{ij}\}$, $r(\lambda)=L_{11} \cdot R(\lambda)+L_{12} \cdot G(\lambda)+L_{13} \cdot B(\lambda)$ $g(\lambda)=L_{21} \cdot R(\lambda)+L_{22} \cdot G(\lambda)+L_{23} \cdot B(\lambda)$ $b(\lambda)=L_{31} \cdot R(\lambda)+L_{32} \cdot G(\lambda)+L_{33} \cdot B(\lambda)$ said first matrix is determined so that the following expression is minimized, $\max_k\{|\log(P_k, r)/(P_0, r)-\log(P_k, g)/(P_0, g)|+|\log(P_k, g)/(P_0, g)-\log(P_k, b)/(P_0, b)|\}$.

Also, it is preferable that, when said first matrix is referred to as $\{L_{ij} (i, j=1 \text{ to } 3)\}$, a reference light source within said inputted light source range is referred to as $P_0$, one light source different from said reference light source within said light source range is referred to as $P_k$ (k represents a kind of light source), and each of r ($\lambda$), g ($\lambda$), and b ($\lambda$) represents effective input spectral sensitivity stipulated by the following expressions from input spectral sensitivity R ($\lambda$), G ($\lambda$), and B ($\lambda$) of said input image data and said first matrix $\{L_{ij}\}$, $r(\lambda)=L_{11} \cdot R(\lambda)+L_{12} \cdot G(\lambda)+L_{13} \cdot B(\lambda)$ $g(\lambda)=L_{21} \cdot R(\lambda)+L_{22} \cdot G(\lambda)+L_{23} \cdot B(\lambda)$ $b(\lambda)=L_{31} \cdot R(\lambda)+L_{32} \cdot G(\lambda)+L_{33} \cdot B(\lambda)$ said first matrix is determined so that the following expression is minimized, $\Sigma_k\{|\log(P_k, r)/(P_0, r)-\log(P_k, g)/(P_0, g)|+|\log(P_k, g)/(P_0, g)-\log(P_k, b)/(P_0, b)|\}$.

Further, to solve the above-described first problem in the same manner, according to a second aspect of the present invention, there is provided a color correction matrix determining apparatus that determines a color correction matrix in a color processing system that converts input image data into output image data and includes at least two color correction matrixes that are a first matrix and a second matrix, with a white balance correction circuit being sandwiched between said first matrix and said second matrix, said color correction matrix determining apparatus comprising:

means for inputting a light source range; and means for determining said first matrix based on said inputted light source range.

Here, it is preferable that said means for determining said first matrix based on said inputted light source range includes:

means for calculating respective average color differences for light sources within said inputted light source range;

means for calculating a maximum value among said respective average color differences; and means for determining said first matrix so that said maximum value among said respective average color differences is minimized.

Also, it is preferable that said means for determining said first matrix based on said inputted light source range includes:

means for calculating respective average color differences for light sources within said inputted light source range;

means for calculating an average value of said respective average color differences; and means for determining said first matrix so that said average value of said respective average color difference is minimized.

Further, to solve the above-described second problem, according to a third aspect of the present invention, there is provided an image photographing method for converting input image data into output image data by using a color processing system and including at least two color correction matrixes that are a first matrix and a second matrix, with a white balance correction circuit being sandwiched between said first matrix and said second matrix, said image photographing method comprising:

discriminating a photographing light source range; and determining said first matrix based on said discriminated photographing light source range.

Here, it is preferable that said discriminating step of the photographing light source range is performed using at least one of the following two methods, a method with which said photographing light source range is discriminated by obtaining image data of at least two images having different cutting degrees of an infrared light region from an identical subject, by performing comparison between said two images based on the obtained image data, and by determining said photographing light source range as fluorescent lamps if it is found that a difference between said two images is smaller than a predetermined value as a result of the comparison and as light sources based on a black-body radiation if said difference between said two images is greater than said predetermined value, and a method with which said photographing light source range is discriminated by obtaining a reference value that is determined by a product sum or integration value of a product of a spectral energy distribution of an object whose color temperature is already known, a spectral sensitivity distribution of a photometering system, and a spectral reflection factor distribution expressed by primary coupling of predetermined three functions, by measuring light from a photographing light source, by obtaining a spectral reflection factor distribution, with which a difference between the reference value and a measurement value is minimized, for each color temperature, by obtaining a sum of abnormal components, in each of which a maximum value of a spectral reflection factor in said obtained spectral reflection factor distribution exceeds 1.0, as an evaluation value, and by estimating a color temperature corresponding to a minimum value of said evaluation value as a color temperature of said photographing light source.

Also, it is preferable that said first matrix is determined so that a maximum value among respective average color differences for light sources within said discriminated photographing light source range is minimized.

Also, it is preferable that said first matrix is determined so that an average value of respective average color differences for light sources within said discriminated photographing light source range is minimized.

Also, it is preferable that, when said first matrix is referred to as $\{L_{ij} (i, j=1 \text{ to } 3)\}$, a reference light source within said discriminated photographing light source range is referred to as $P_0$, one light source different from said reference light source within said discriminated photographing light source range is referred to as $P_m$ (m represents a kind of light source), and each of r ($\lambda$), g ($\lambda$), and b ($\lambda$) represents effective input spectral sensitivity stipulated by the following expressions from input spectral sensitivity R ($\lambda$), G ($\lambda$), and B ($\lambda$) of said input image data and said first matrix $\{L_{ij}\}$, $r(\lambda)=L_{11} \cdot R(\lambda)+L_{12} \cdot G(\lambda)+L_{13} \cdot B(\lambda)$ $g(\lambda)=L_{21} \cdot R(\lambda)+L_{22} \cdot G(\lambda)+L_{23} \cdot B(\lambda)$ $b(\lambda)=L_{31} \cdot R(\lambda)+L_{32} \cdot G(\lambda)+L_{33} \cdot B(\lambda)$ said first matrix is determined so that the following expression is minimized, $\max_m \{|\log(P_m, r)/(P_0, r)-\log(P_m, g)/(P_0, g)|+|\log(P_m, g)/(P_0, g)-\log(P_m, b)/(P_0, b)|\}$.

Also, it is preferable that, when said first matrix is referred to as $\{L_{ij} (i, j=1 \text{ to } 3)\}$, a reference light source within said discriminated light source range is referred to as $P_0$, one light source different from said reference light source within said discriminated photographing light source range is referred to as $P_m$ (m represents a kind of the light source), and each of r ($\lambda$), g ($\lambda$), and b ($\lambda$) represents effective input spectral sensitivity stipulated by the following expressions from input spectral sensitivity R ($\lambda$), G ($\lambda$), and B ($\lambda$) of said input image data and said first matrix $\{L_{ij}\}$, $r(\lambda)=L_{11} \cdot R(\lambda)+L_{12} \cdot G(\lambda)+L_{13} \cdot B(\lambda)$ $g(\lambda)=L_{21} \cdot R(\lambda)+L_{22} \cdot G(\lambda)+L_{23} \cdot B(\lambda)$ $b(\lambda)=L_{31} \cdot R(\lambda)+L_{32} \cdot G(\lambda)+L_{33} \cdot B(\lambda)$ said first matrix is determined so that the following expression is minimized, $\Sigma_m \{|\log(P_m, r)/(P_0, r)-\log(P_m, g)/(P_0, g)|+|\log(P_m, g)/(P_0, g)-\log(P_m, b)/(P_0, b)|\}$.

Further, to solve the above-described second problem in the same manner, according to a fourth aspect of the present invention, there is provided an image photographing apparatus that includes a color processing system that converts input image data into output image data and includes at least two color correction matrixes that are a first matrix and a second matrix, with a white balance correction circuit being sandwiched between said first matrix and said second matrix, said image photographing apparatus comprising:

means for discriminating a photographing light source range; and means for determining the first matrix based on said discriminated photographing light source range.

Here, it is preferable that said discriminating means of the photographing light source range has at least one of first and second photographing light source range discriminating means, said first photographing light source range discriminating means that includes: means for obtaining image data of at least two images having different cutting degrees of an infrared light region from an identical subject; means for performing comparison between said two images based on the obtained image data; and means for determining a type of photographing light sources based on a result of the comparison; and said second photographing light source range discriminating means that includes: storing means for storing in advance a reference value that is determined by a product sum or integration value of a product of a spectral energy distribution of an object whose color temperature is already known, a spectral sensitivity distribution of a photometering system, and a spectral reflection-factor distribution expressed by primary coupling of predetermined three functions; measurement means for measuring light from a photographing light source; spectral reflection factor distribution computing means for computing a spectral reflection factor distribution, with which a difference between the reference value and a measurement value is minimized, for each color temperature; evaluation value computing means for computing a sum of abnormal components, in each of which a maximum value of a spectral reflection factor in said obtained spectral reflection factor distribution exceeds 1.0, as an evaluation value; and means for estimating a color temperature corresponding to a minimum value of said evaluation value as a color temperature of said photographing light source.

Also, it is preferable that said means for determining the first matrix based on the discriminated photographing light source range determines said first matrix so that a maximum value among respective average color differences for light sources within said discriminated photographing light source range is minimized.

Also, it is preferable that said means for determining the first matrix based on the discriminated photographing light source range determines said first matrix so that an average value of respective average color differences for light sources within said discriminated photographing light source range is minimized.

In this specification, the term "light source range" means a class concerning the light emission waveform of a light source. In more detail, this term indicates whether a light source utilizing blackbody radiation or a fluorescent lamp is used. In addition, if the fluorescent lamp is used, this term indicates the class of a light emission waveform, such as an ordinary (usual) type, a high color rendering type, or a three-waveform type. Also, the sentence "a light source range is inputted" means that there is inputted information on the class of a light emission waveform to which the light source belongs.

Also, in this specification, the term "input spectral sensitivity" indicates the spectral sensitivity of an image input apparatus if an input image is an image inputted by an image input apparatus such as a digital still camera (DSC) or a scanner. Note that in the case of a scanner, data generated by the spectral sensitivity (including a filter) of a reading element (such as CCD) is used in many cases, so that the input spectral sensitivity becomes as follows.

Input spectral sensitivity=Apparatus spectral sensitivity=Element spectral sensitivity However, in the case of the DSC, there is combined a color correction matrix in many cases, so that it is possible to express the input spectral sensitivity as follows.

Input spectral sensitivity=Apparatus spectral sensitivity=Element spectral sensitivity×Matrix Accordingly, in the case of the DSC, attention is paid to a fact that the input spectral sensitivity is not the element spectral sensitivity in itself but is the combination of the element spectral sensitivity and the color correction matrix. Therefore, in order to emphasize this "combination", the input spectral sensitivity in this case will be described as "effective input spectral sensitivity". However, as described above, if attention is paid to the meaning of the apparatus spectral sensitivity, the "input spectral sensitivity" and the "effective input spectral sensitivity" have the same meaning.

It should be noted here that in this specification, in the case of a DSC whose element spectral sensitivity and color correction matrix are both uncertain or are not available, it is impossible to define the input spectral sensitivity. However, each consumer-oriented DSC is pursuant to the BT709 standard in principle, so that the input spectral sensitivity may be replaced with the input spectral sensitivity under the BT709 standard.

In this case, it is possible to express the input spectral sensitivity as follows.

Input spectral sensitivity=Spectral sensitivity under BT709 standard

Also, in this specification, there is used the sentence "input image data obtained without using an imaging element". In the case where an input image is an image produced on a television monitor, such as a CG (computer graphics) image, it is impossible to use the following definition.

Input spectral sensitivity=Apparatus spectral sensitivity

In this case, it is possible to regard a color matching function corresponding to the primary color (phosphor) of a monitor as the input spectral sensitivity as follows.

Input spectral sensitivity=Color matching function corresponding to monitor primary color It should be noted here that in the case where the primary color is uncertain, in the case of a household television, for instance, the input spectral sensitivity may be replaced with the spectral sensitivity under the NTSC standard as follows.

Input spectral sensitivity=Spectral sensitivity under NTSC standard

In the case of a high-definition TV, it is possible to use the spectral sensitivity under the BT709 standard as a substitute as follows.

Input spectral sensitivity=Spectral sensitivity under BT709 standard

Also, in this specification, the term "output image data" represents image data outputted from an image input apparatus (DSC or scanner).

DETAILED DESCRIPTION OF THE PREFERRED EMBODIMENTS

Color correction matrix determining method and apparatus and image photographing method and apparatus according to the present invention will be described in detail below based on preferred embodiments shown in the accompanying drawings.

First, color correction matrix determining method and apparatus of first and second aspects of the present invention will be described with reference to FIGS. 1 to 5B.

Figure 9:
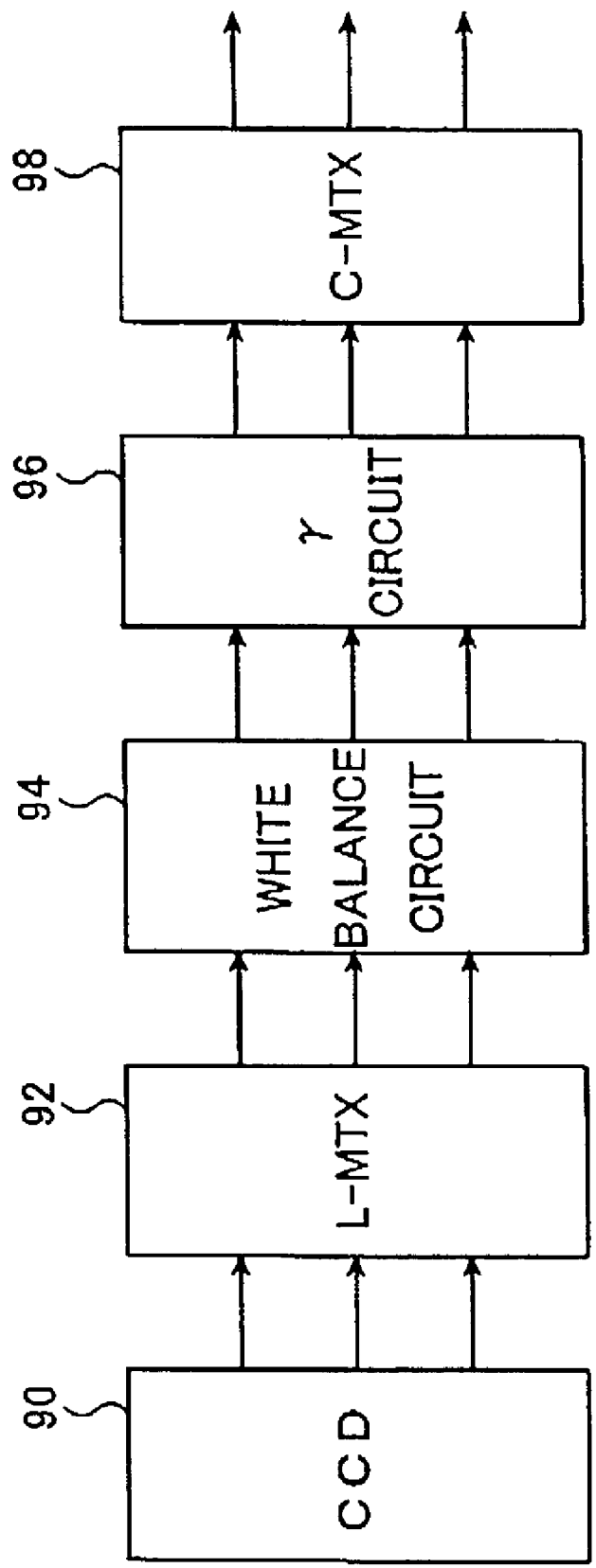
FIG. 9 is a block diagram showing an example construction of a color processing system, which has two color correction matrixes, of a conventional digital camera (image photographing apparatus).

In a first embodiment of the first and second aspects of the present invention, in a color processing system shown in FIG. 9 of a digital camera or the like in which two color correction matrixes (a first matrix (L-MTX) and a second matrix (C-MTX)) are provided so that a white balance correction circuit is sandwiched therebetween, the first matrix is properly determined so that there is resolved a light source dependency of the second matrix. Note that in FIG. 9, a γ circuit is arranged so as to precede the second matrix, although there is imposed no specific limitation on this arrangement order and there occurs no problem so long as the first matrix and the second matrix are arranged so that the white balance correction circuit is sandwiched therebetween.

Figure 1:
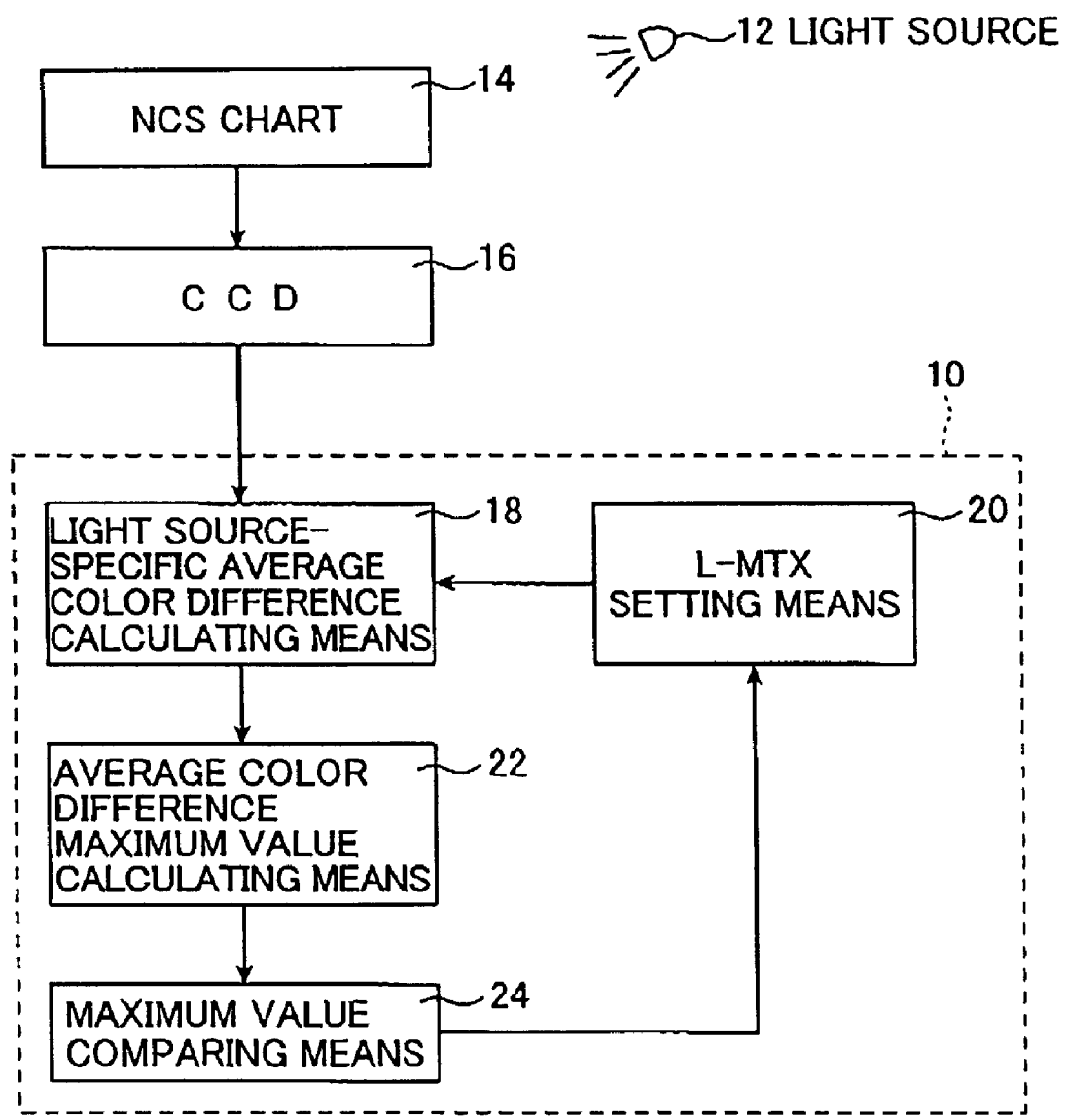
FIG. 1 is a block diagram showing an outline of a construction of a color correction matrix determining apparatus according to a first embodiment of a second aspect of the present invention.

FIG. 1 is a block diagram showing an outline of a construction of a color correction matrix determining apparatus according to the first embodiment of the second aspect of the present invention that carries out a color correction matrix determining method of the first aspect of the present invention.

As shown in FIG. 1, a color correction matrix determining apparatus 10 of the first embodiment inputs image data obtained by imaging an NCS chart 14 as a subject using a CCD 16 under a light source 12 and determines the first matrix (L-MTX) using this image data so that there is resolved the light source dependency of the second matrix (C-MTX). To do so, the color correction matrix determining apparatus comprises a light source-specific average color difference calculating means 18, a first matrix (L-MTX) setting means 20, an average color difference maximum value calculating means 22, and a maximum value comparing means 24.

The imaging of the NCS chart 14 is performed under a plurality of kinds of light sources by changing the light source 12 in various ways. As examples of the kind of the light source 12, there may be cited a light source A, a light source C, a light source D55, a light source F4, and the like.

By performing the imaging using the CCD 16 by changing the light source 12 in this manner, a light source range is inputted into the color correction matrix determining apparatus 10.

It should be noted here that a subject is imaged using the CCD in this manner and there is inputted an image in this embodiment, although an imaging element is not limited to the CCD and it is possible to suitably use a CMOS sensor, a photomultiplier, or the like in addition to the CCD.

Further, the present invention is applicable to image data obtained through the recording of a printed original using a scanner in addition to image data obtained through the imaging of a subject using the imaging element in this manner.

The light source-specific average color difference calculating means 18 calculates an average color difference for each light source from inputted image data. At this time, the average color difference is calculated using a matrix coefficient $\{L_{ij}\}$ set by the first matrix (L-MTX) setting means 20.

The average color difference calculated for each light source is sent to the average color difference maximum value calculating means 22. The maximum value calculating means 22 calculates the maximum value among the average color differences. The maximum value of the average color differences for respective light sources is sent to the maximum value comparing means 24. This maximum value comparing means 24 compares the sent maximum value with the minimum value among the maximum values previously sent In the case where the newly sent maximum value is smaller than the minimum value among the previous maximum values, the maximum value comparing means 24 sends a signal to the first matrix setting means 20. This first matrix setting means 20 performs the setting of the first matrix again and sends a new first matrix to the average color difference calculating means 18. The average color difference calculating means 18 then calculates the average color difference for each light source again and the same processing as above is repeated. When it becomes impossible to further reduce the maximum value of the average color difference, the first matrix set at that timing is regarded as the first matrix that should be obtained and is determined as the first matrix.

An operation in this embodiment will be described below by following a flowchart shown in FIG. 2.

Figure 2:
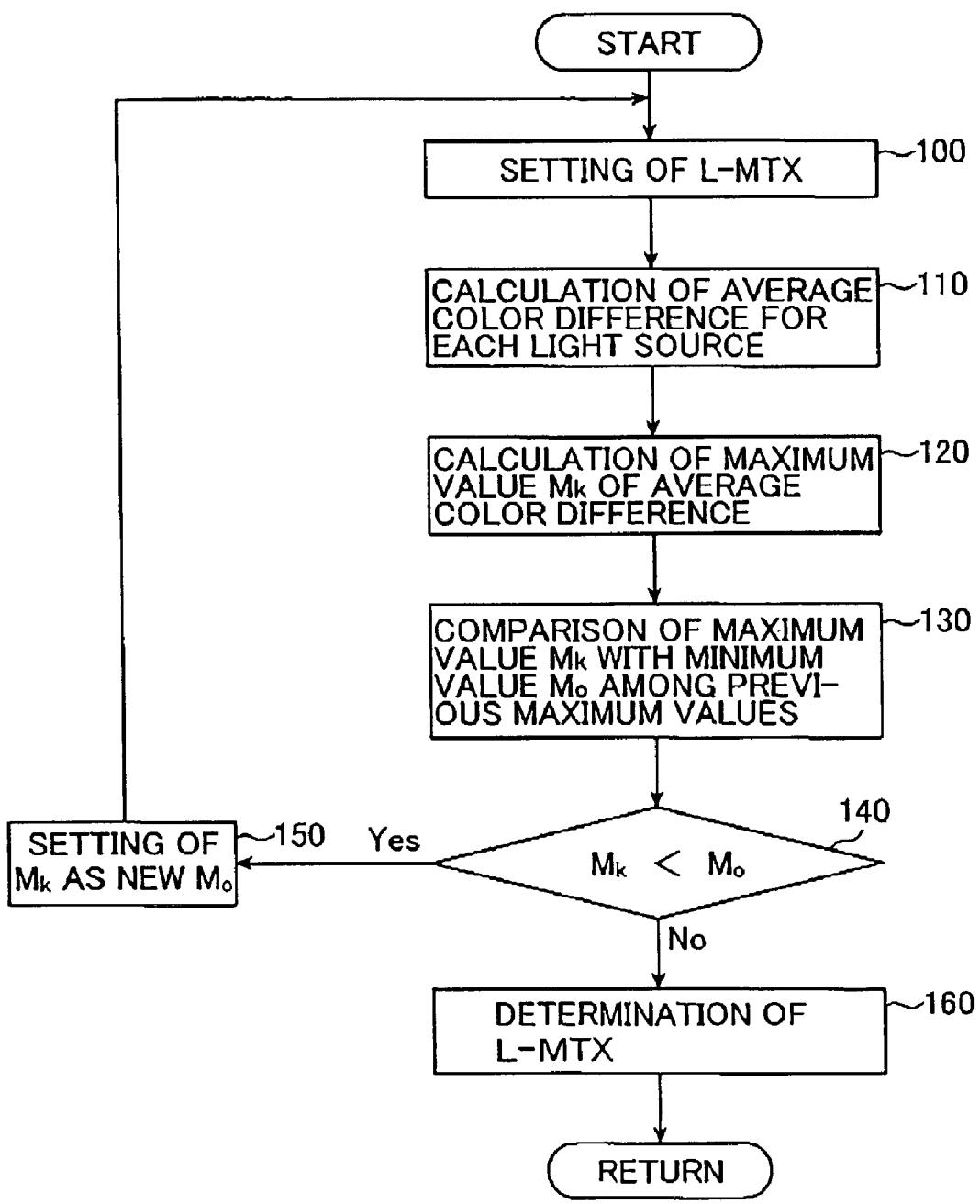
FIG. 2 is a flowchart showing a flow of processing in the first embodiment of the present invention.

It should be noted here that the flowchart in FIG. 2 shows a procedure of matrix determination performed after a subject (NCS chart 14) is imaged using the CCD 16 under various kinds of light sources 12 and image data obtained by the imaging is inputted into the color correction matrix determining apparatus 10.

First, in Step 100, the first matrix (L-MTX) setting means 20 sets the first matrix and sends the set first matrix to the average color difference calculating means 18.

In Step 110, the average color difference calculating means 18 calculates an average color difference for each light source.

Next, in Step 120, the maximum value calculating means 22 calculates a maximum value $M_k$ among the average color differences calculated for respective light sources in Step 110.

In Step 130, the maximum value comparing means 24 compares the newly obtained maximum value $M_k$ of the average color difference with a minimum value $M_0$ among the maximum values of the average color differences previously obtained.

In Step 140, in the case where there is obtained a judgment result of $M_k<M_0$, the processing proceeds to Step 150 in which this $M_k$ is set as a new minimum value $M_0$ among the maximum values. Then, the processing returns to Step 100, the first matrix applied to this calculation is stored in a memory, the setting of the first matrix is performed again, and the same computation as that performed until now is repeated again. Then, in Step 140, at a point in time when it becomes impossible to further reduce the minimum value $M_0$ among the average color difference maximum values, the processing proceeds to Step 160 in which the first matrix, which is stored in the memory at this point in time, is determined as a matrix that has been optimized so that there is resolved the light source dependency of the second matrix.

Next, there will be described a second embodiment of the present invention.

In the first embodiment described above, in order to determine the first matrix, the first matrix is optimized by minimizing the maximum value of the average color differences for respective light sources. In this embodiment, however, the first matrix is optimized by minimizing an average value of the average color differences for respective light sources.

Figure 3:
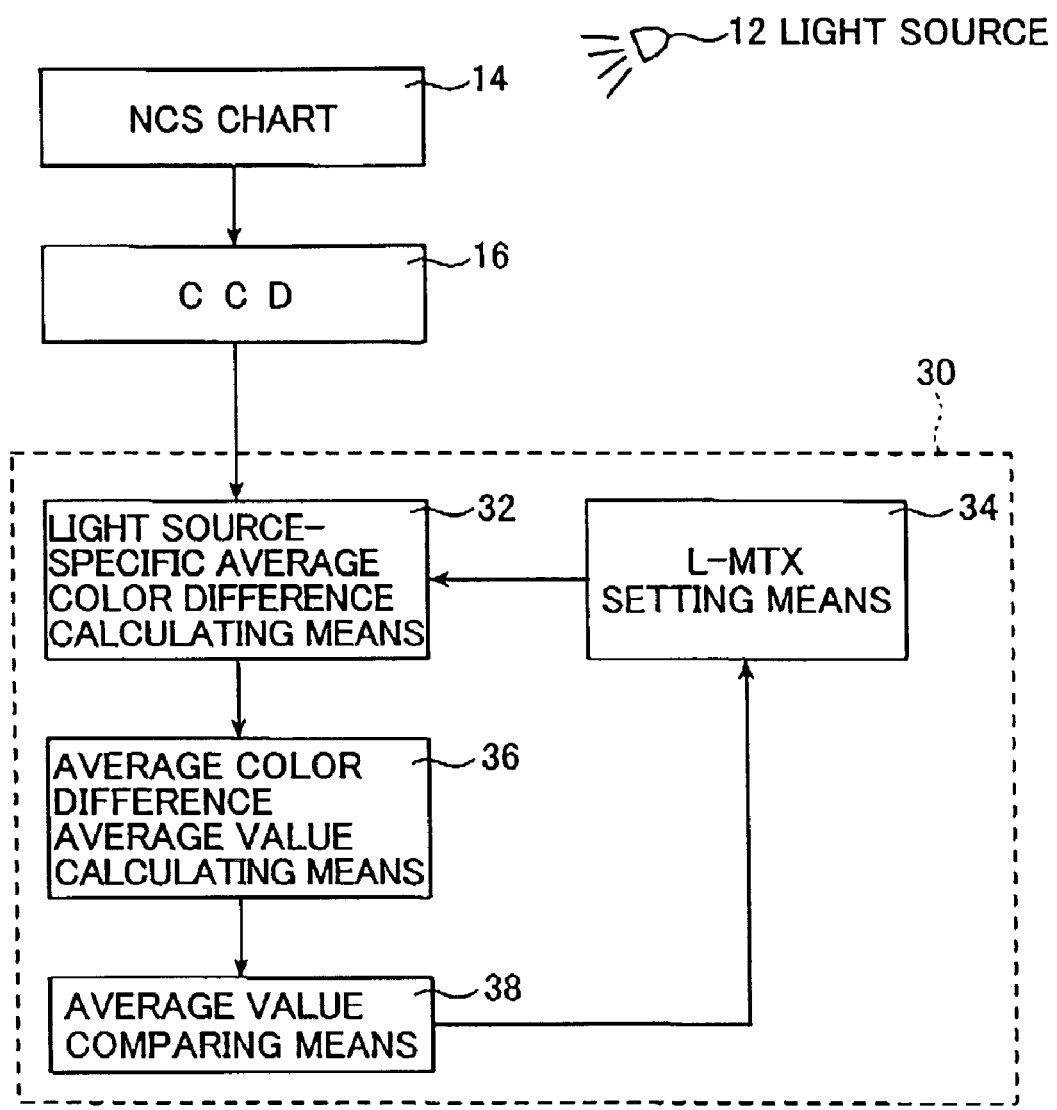
FIG. 3 is a block diagram showing an outline of a construction of a color correction matrix determining apparatus according to a second embodiment of the second aspect of the present invention.

FIG. 3 shows an outline of a construction of a color correction matrix determining apparatus 30 of this embodiment.

As shown in FIG. 3, the color correction matrix determining apparatus 30 of this embodiment inputs image data obtained by imaging the NCS chart 14 as a subject using the CCD 16 under the light source 12, and includes an average color difference calculating means 32 for calculating an average color difference for each light source from this image data, a first matrix (L-MTX) setting means 34, an average color difference average value calculating means 36 for calculating an average value from the average color differences for respective light sources, and an average value comparing means 38 for performing comparison of the average value in order to calculate the minimum value among the average values.

Figure 4:
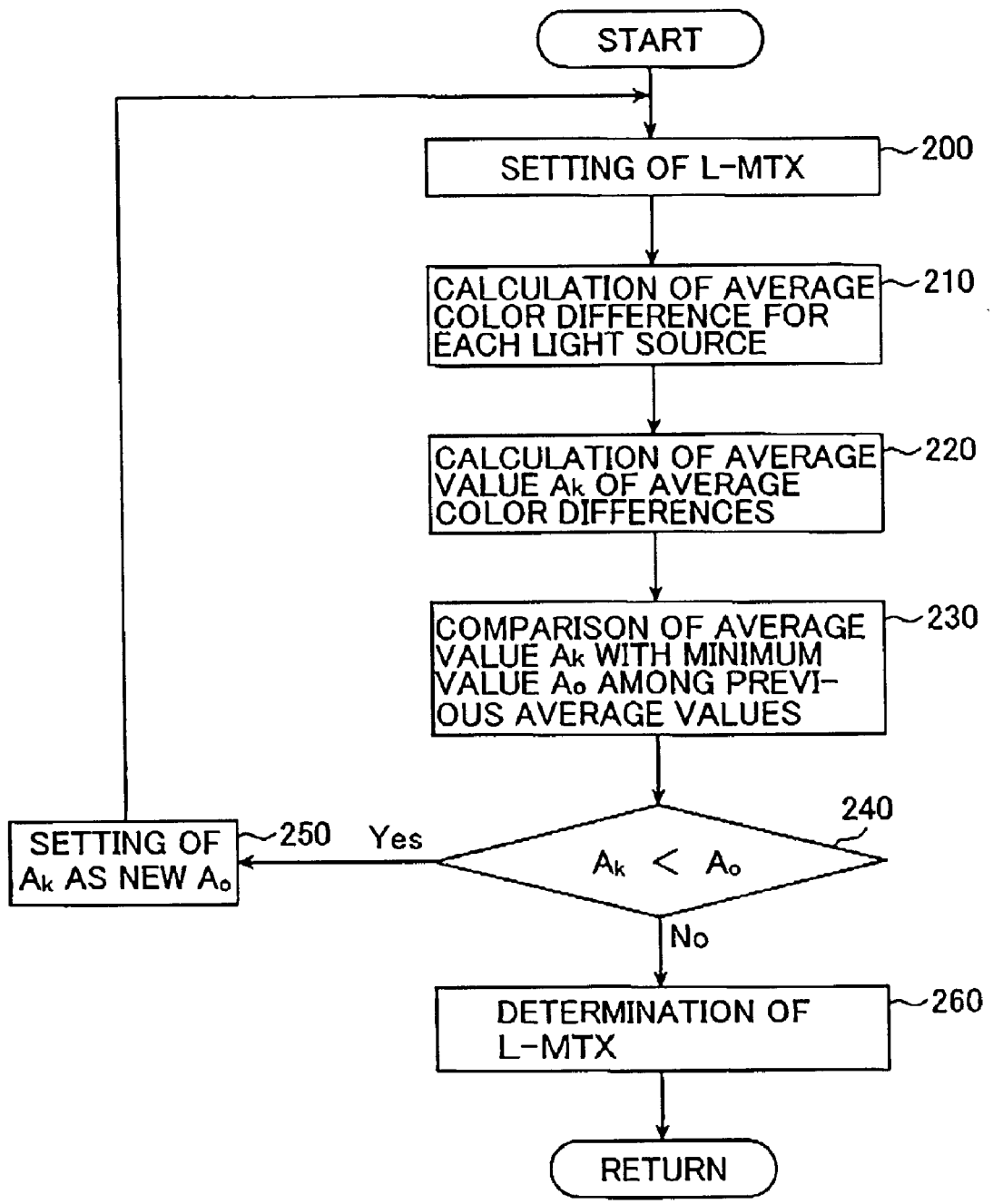
FIG. 4 is a flowchart showing a flow of processing in the second embodiment of the present invention.

Also, FIG. 4 shows a flow of processing in this embodiment.

This embodiment is approximately the same as the first embodiment described above except that the average value of the average color differences for respective light sources is used in place of the maximum value of the average color differences for respective light sources. That is, after there is inputted image data obtained through the imaging of the NCS chart 14 using the CCD 16 under a plurality of light sources 12, the first matrix (L-MTX) is set in Step 200, an average color difference for each light source is calculated in Step 210 using this matrix, and an average value $A_k$ of the average color differences for respective light sources is calculated in Step 220.

In order to select the minimum value among the average values in Step 230, there is performed comparison with a minimum value $A_0$ among previous average values. In Step 240, in the case of $A_k<A_0$, the processing proceeds to Step 250 in which $A_k$ is set as new $A_0$. Then, the processing returns to Step 200 in which the setting of the first matrix is performed again and the first matrix is optimized by minimizing the average value. In this manner, the first matrix is determined in Step 260.

As described above, in order to optimize and determine the first matrix, it is possible to minimize the maximum value among the average color differences for respective light sources. Alternatively, it is possible to minimize the average value of the average color differences for respective light source. This point will be described in more detail later using expressions.

Next, a more specific embodiment will be described.

Figure 5A:
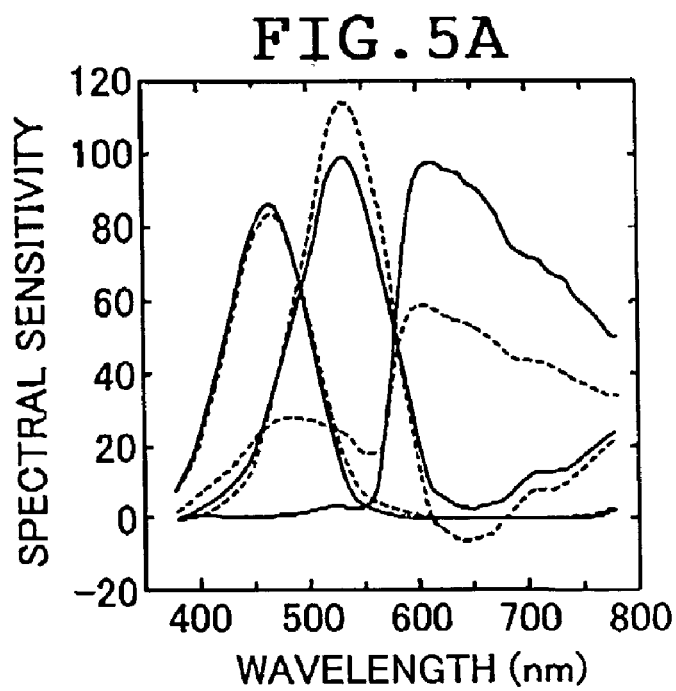
FIGS. 5A and 5B are respectively a chart showing a spectral sensitivity of a CCD of type 1 used in the embodiment of the present invention and a chart showing a spectral sensitivity of a CCD of type 2 used in the embodiment of the present invention.
Figure 5B:
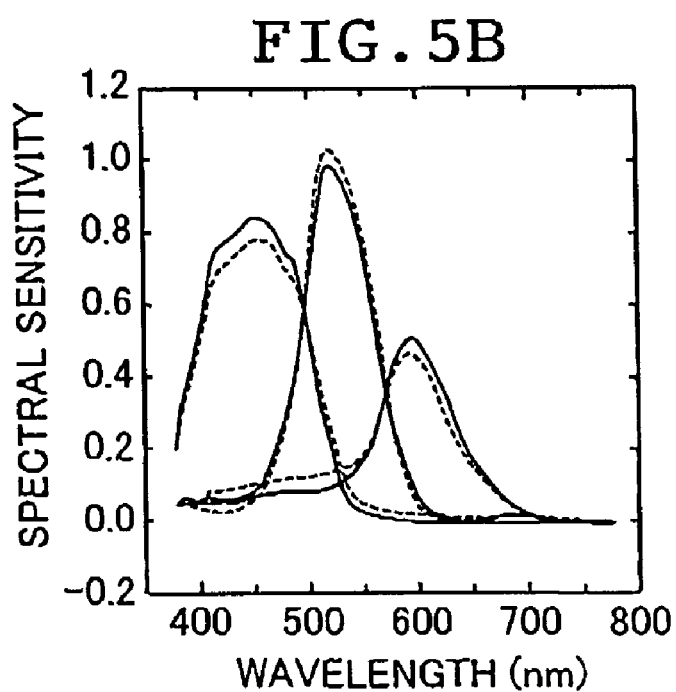

By using a CCD of type 1 having a spectral sensitivity expressed by the solid line in FIG. 5A and a CCD of type 2 having a spectral sensitivity expressed by the solid line in FIG. 5B, an NCS chart is imaged under 18 kinds of light sources shown in Table 2.

The average color difference for each light source calculated from image data obtained through the imaging using each of the CCDs of type 1 and type 2 is shown in one of columns named "Original" in Table 2.

TABLE 2

| Light source | Type 1 | | Type 2 | |
| --- | --- | --- | --- | --- |
| | Original | Optimized | Original | Optimized |
| A | 21.53 | 14.46 | 7.44 | 10.65 |
| C | 7.78 | 6.15 | 3.77 | 4.34 |
| D50 | 7.33 | 6.79 | 2.56 | 2.66 |
| D55 | 7.06 | 7.06 | 2.81 | 2.81 |
| D65 | 7.68 | 7.87 | 3.84 | 4.30 |
| D75 | 8.63 | 8.64 | 4.72 | 5.55 |
| F1 | 10.73 | 14.30 | 7.66 | 8.17 |
| F2 | 13.31 | 13.78 | 10.46 | 8.55 |
| F3 | 16.31 | 14.03 | 13.09 | 9.22 |
| F4 | 18.95 | 14.43 | 15.44 | 9.85 |
| F5 | 10.99 | 14.45 | 8.34 | 8.72 |
| F6 | 14.25 | 14.18 | 11.61 | 9.17 |
| F7 | 10.43 | 10.35 | 5.04 | 5.57 |
| F8 | 8.02 | 7.63 | 2.77 | 2.46 |
| F9 | 8.48 | 7.81 | 4.19 | 3.31 |
| F10 | 14.31 | 14.12 | 11.51 | 9.50 |
| F11 | 13.76 | 12.32 | 11.07 | 8.28 |
| F12 | 12.28 | 10.09 | 10.95 | 7.26 |
| Maximum value | 21.53 | 14.46 | 15.44 | 10.65 |
| Average value | 11.77 | 11.14 | 7.63 | 6.69 |

As shown in Table 2, in the case of type 1, the average color difference in the "Original" column assumes the maximum value that is 21.53 in the case of the light source A and the average value of the average color differences is 11.77.

On the other hand, in the case of type 2, the average color difference in the "Original" column assumes the maximum value that is 15.44 in the case of the light source F4 and the average value of the average color differences is 7.63.

Here, with the method of the first embodiment described above, the first matrix is optimized by minimizing the maximum value of the average color differences for respective light sources shown in Table 2.

The average color difference for each light source and its maximum value and average value in the case where the first matrix is optimized in each case of type 1 and 2 are shown in one of the columns named "Optimized" in Table 2. In the case of type 1, after the optimization, there is obtained the maximum value of the average color differences also in the case of the light source A. However, in the case of type 2, although the maximum value is obtained for the light source F4 before the optimization, the maximum value is obtained for the light source A after the optimization.

As described above, as a result of an operation where the first matrix is optimized so that there is minimized the maximum value of the average color differences, the average value of the average color differences is significantly improved for each of type 1 and type 2 as indicated by the numerical values in the column at the lowest level of Table 2.

Also, the result of the optimized first matrix is shown in Table 3.

TABLE 3

| Type 1 | | | Type 2 | | |
| --- | --- | --- | --- | --- | --- |
| 0.58 | 0.19 | 0.23 | 0.94 | 0.03 | 0.03 |
| −0.10 | 1.16 | −0.06 | −0.02 | 1.04 | −0.02 |
| 0.00 | 0.04 | 0.96 | 0.03 | 0.03 | 0.94 |

It should be noted here that as a result of the optimization of the first matrix in this manner, the spectral sensitivity of each of the CCDs of type 1 and type 2 is optimized as indicated by the broken lines in FIGS. 5A and 5B.

The first matrix (L-MTX) is optimized in this manner, so that it becomes possible to fix the second matrix (C-MTX) using, for instance, a coefficient value with respect to the standard light source D55 shown in Table 1 and to use the fixed second matrix, thereby suppressing the light source dependency. By doing so, it becomes possible to apply the first matrix to the improvement of the light source dependency, to apply the second matrix to color conversion-in original meaning (color conversion from RGB of a CCD to RGB under the BT 709), to clearly divide rolls played by the two color correction matrixes, and to utilize the characteristic of the construction where there are provided two color correction matrixes.

Next, there will be described a color reproduction error caused by the fixation of the second matrix.

When tristimulus values calculated from an exposure amount under a reference light source $P_0(\lambda)$ are referred to as X, Y, and Z and tristimulus values calculated from an exposure amount under a photographing light source $P(\lambda)$ are referred to as X', Y', and Z' with respect to a subject spectral reflection factor $h(\lambda)$, $\Delta a^*$ caused by the fixation of a color conversion coefficient can be evaluated from Expression (5) given below.

$$|\Delta a^*| = |\{(X'/X_0')^{1/3} - (Y'/Y_0')^{1/3}\} - \{(X'/X_0')^{1/3} - (Y'/Y_0')^{1/3}\}| \quad (5)$$

$$\approx |\{\log(X'/X_0') - \log(Y'/Y_0')\} - \{\log(X'/X_0') - \log(Y'/Y_0')\}|$$

$$\approx \left|\left\{\frac{\log(Ph, r)}{(P, r)} - \frac{\log(Ph, g)}{(P, g)}\right\} - \left\{\frac{\log(P_0h, r)}{(P_{0,r})} - \frac{\log(P_0h, g)}{(P_{0,g})}\right\}\right|$$

$$\leq \left|\frac{\log(Ph, r)}{(P_0h, r)} - \frac{\log(Ph, g)}{(P_0h, g)}\right| + \left|\frac{\log(P, r)}{(P_0, r)} - \frac{\log(P, g)}{(P_0, g)}\right|$$

Also, in a like manner, $\Delta b^*$ caused by the fixation of the color conversion coefficient can be evaluated from Expression (6) given below.

$$|\Delta b^*| \leq \left|\frac{\log(Ph, g)}{(P_0h, g)} - \frac{\log(Ph, b)}{(P_0h, b)}\right| + \left|\frac{\log(P, g)}{(P_0, g)} - \frac{\log(P, b)}{(P_0, b)}\right| \quad (6)$$

Accordingly, by using an appropriate constant, the color reproduction error can be evaluated using Expression (7) given below.

$$|\Delta a^*| + |\Delta b^*| \leq \left|\frac{\log(P, r)}{(P_0, r)} - \frac{\log(P, g)}{(P_0, g)}\right| + \left|\frac{\log(P, g)}{(P_0, g)} - \frac{\log(P, b)}{(P_0, b)}\right| + \text{Const.} \quad (7)$$

Here, in the case of a digital camera, there is usually provided an AE (auto-exposure) mechanism and brightness adjustment is performed using this mechanism, so that L* is substantially canceled. As a result, as to ΔE, it is enough to consider only Δa* and Δb and ΔE is given by Expression (8) given below.

$$\Delta E = \{(\Delta a^*)^2 + (\Delta b^*)^2\}^{1/2} \quad (8)$$

In this manner, it becomes possible to minimize the color difference ΔE by minimizing the right side of Expression (7).

It should be noted here that as can be understood from Expression (7), this expression does not contain a subject h (λ) and it is not required to image a subject, such as a specific chart like an NCS chart, and it is possible to determine the first matrix through optimization performed by minimizing the right side of Expression (7) by inputting only the light source range.

In reality, as to the right side of Expression (7), it is enough to determine the first matrix (L-MTX) described above by minimizing Expression (9) below through the obtainment of the maximum value $\max_k$ among a plurality of light sources $P_k$ (k represents the kind of the light source).

$$\max_k\{|\log(P_k, r)/(P_o, r) - \log(P_k, g)/(P_o, g)| + |\log(P_k, g)/(P_o, g) - \log(P_k, b)/(P_o, b)|\} \quad (9)$$

Alternatively, there may be minimized the average value on the right side of Expression (7). The minimization of the average value on the right side is equivalent to the minimization of the sum of each light source $P_k$. Consequently, the first matrix (L-MTX) described above may be determined by minimizing the sum $\Sigma_k$ expressed by Expression (10) given below.

$$\Sigma_k\{|\log(P_k, r)/(P_o, r) - \log(P_k, g)/(P_o, g)| + |\log(P_k, g)/(P_o, g) - \log(P_k, b)/(P_o, b)|\} \quad (10)$$

It should be noted here that in the case where image data is inputted using an imaging element, such as a CCD, as described in each embodiment, "r", "g", and "b" in the expression described above represent the imaging system spectral sensitivity stipulated by Expressions (2) to (4) described above. In the case of input image data that is not obtained using an imaging element, it is assumed that these "r", "g", and "b" represent effective input spectral sensitivity.

As described above, with the technique of this embodiment, it becomes possible to carry out a color correction matrix determining method that utilizes a characteristic of a construction where there are provided two color correction matrixes. It also becomes possible to determine the first matrix so that there is resolved the light source dependency of the second matrix only by inputting the light source range.

The color correction matrix determining method and apparatus of the first and second aspects of the present invention are fundamentally constructed in the manner described above.

Next, an image photographing method and apparatus of third and fourth aspects of the present invention will be described with reference to FIGS. 6 to 8 as well as FIGS. 1 and 3.

The image photographing method and apparatus of the third and fourth aspects of the present invention determine a color correction matrix (in more detail, the second matrix (C-MTX)) using the color correction matrix determining method and apparatus of the first and second aspects of the present invention.

Figure 6:
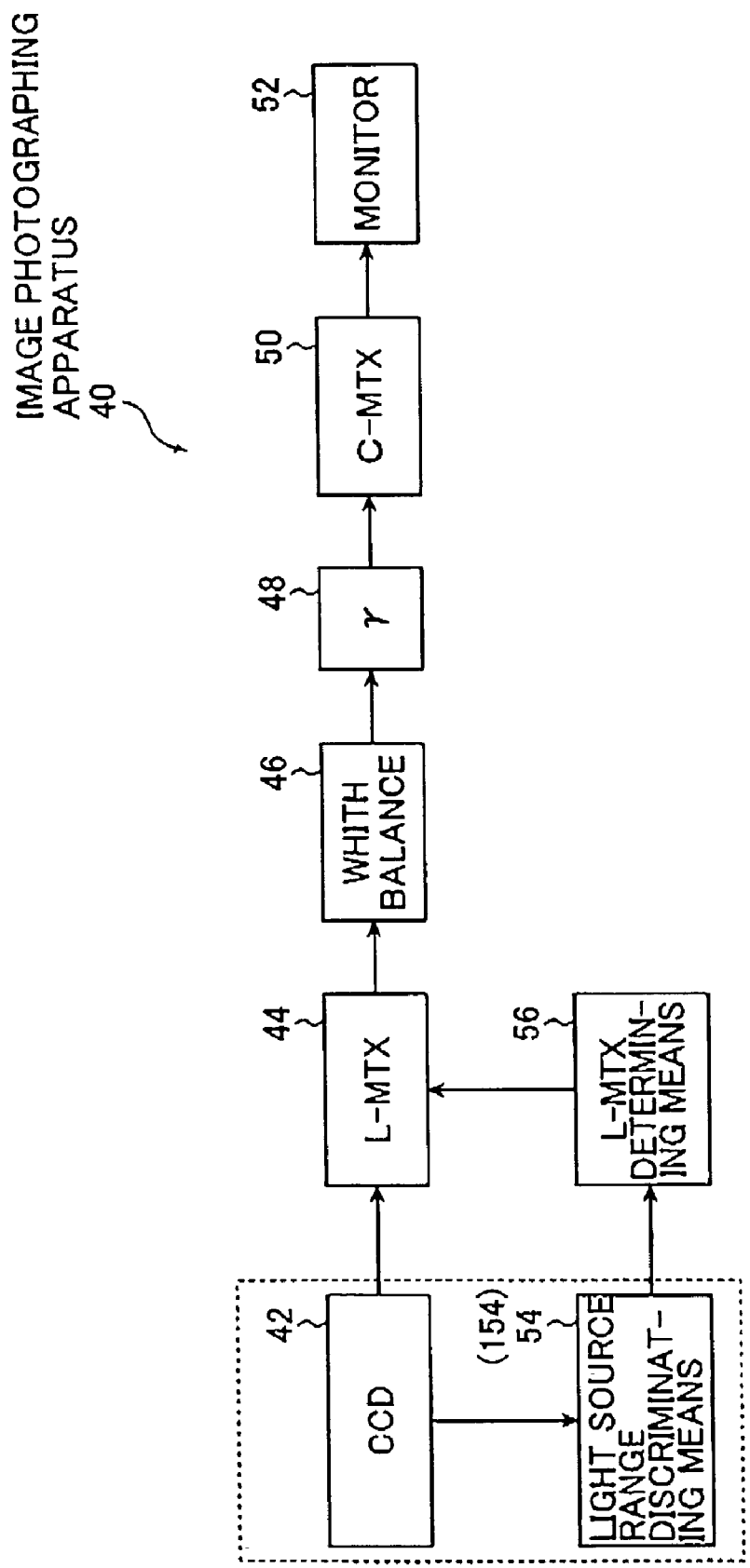
FIG. 6 is a block diagram showing an outline of a construction of an embodiment of an image photographing apparatus according to a fourth aspect of the present invention.

FIG. 6 is a block diagram showing an outline of a construction of an embodiment of the image photographing apparatus according to the fourth aspect of the present invention that carries out the image photographing method according to the third aspect of the present invention.

As shown in FIG. 6, the image photographing apparatus 40 of this embodiment includes a CCD 42, a first matrix (L-MTX) 44, a white balance correction circuit 46, a γ circuit 48, a second matrix (C-MTX) 50, a monitor 52, a light source range discriminating means 54, and a first matrix (L-MTX) determining means 56.

It should be noted here that in addition to these construction elements, the image photographing apparatus 40 includes an image memory, an image processing unit, and an image outputting unit that are necessary for usual photographing, a CPU that controls each circuit and the like, and a various kinds of operation switches such as a shutter button. However, the description of these construction elements will be omitted.

As described above, in this embodiment, in the case where image data obtained through photographing with the CCD 42 is ultimately displayed, for example, on a monitor 52 such as a liquid crystal display, it is required to perform conversion of the image data. To do so, two color correction matrixes that are the first matrix (hereinafter referred to as "L-MTX") 44 and the second matrix (hereinafter referred to as "C-MTX") 50 are provided so that a white balance correction circuit 46 for performing white balance correction and a γ circuit 48 for performing γ correction are sandwiched therebetween.

It should be noted here that the arrangement order of the γ circuit 48 and the C-MTX 50 is not limited to this order and there occurs no problem so long as the L-MTX 44 and the C-MTX 50 are arranged so that the white balance correction circuit 46 is sandwiched therebetween.

The light source range discriminating means 54 discriminates the photographing light source range in which there is performed the photographing of an image. Also, the first matrix (L-MTX) determining means (hereinafter referred to as the "L-MTX determining means") 56 optimizes the L-MTX 44 within the light source range discriminated by the above operation so that there is resolved the light source dependency of the C-MTX 50.

It should be noted here that if it is possible to uniquely decide the photographing light source using the light source range discriminating means 54, it is enough to set the L-MTX 44 and the C-MTX 50 corresponding to the light source, which means that it is not specifically required to determine these matrixes by performing optimization. At this time, for instance, the L-MTX 44 may be set as a unit matrix and the C-MTX 50 may be set by extracting a matrix that has been prestored in a memory so as to correspond to each light source.

Figure 7:
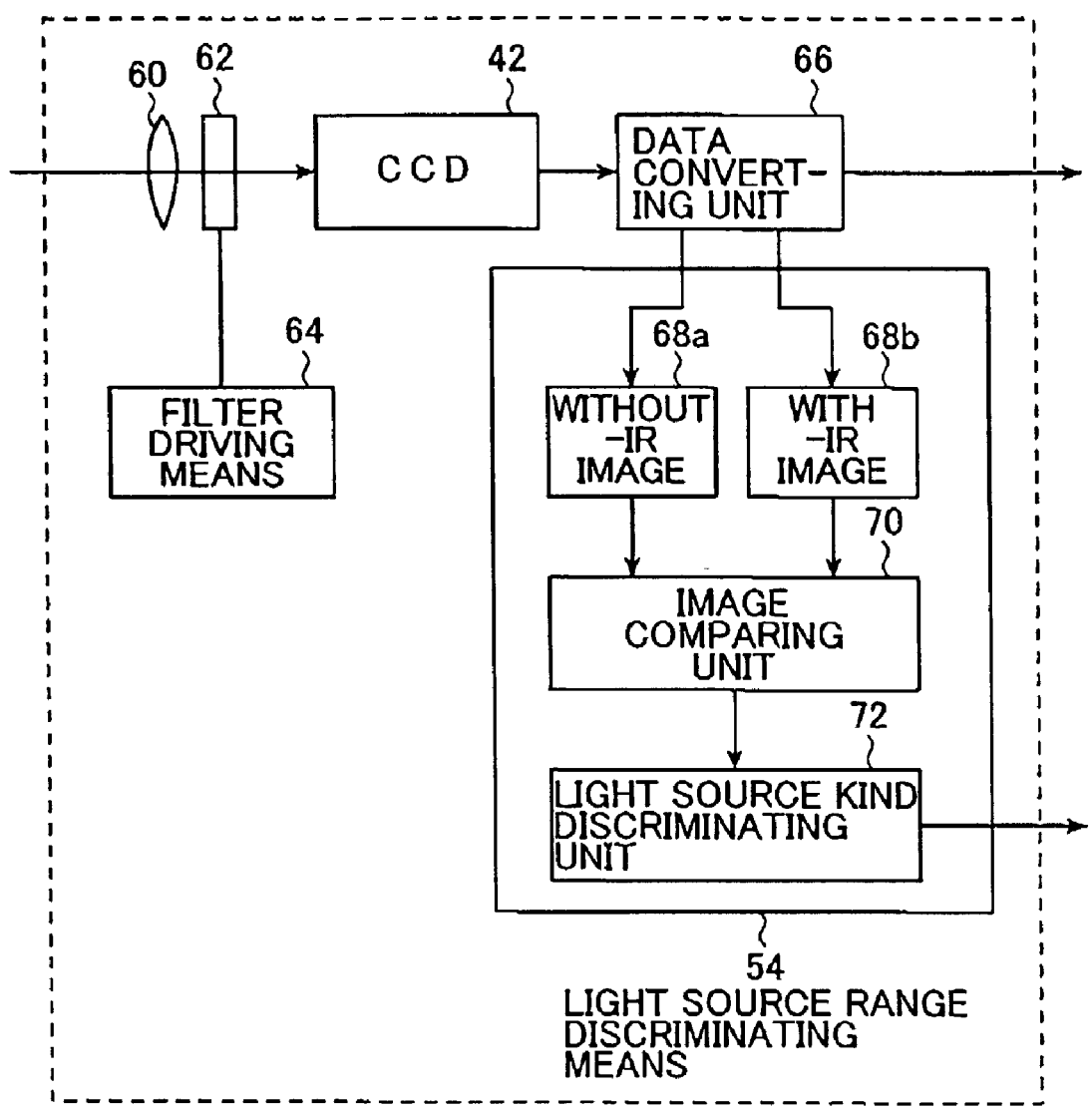
FIG. 7 is a block diagram showing an outline of a construction of a light source range discriminating means in the embodiment of the present invention.

FIG. 7 shows the outline of the construction of the light source range discriminating means 54.

As shown in FIG. 7, the CCD 42 is provided with a photographing lens 60 and an IR cut filter 62 for cutting rays in an infrared light region. This IR cut filter 62 is put on and off a photographing optical axis by a filter driving means 64.

Also, to a CCD 42, there is connected a data conversion unit 66 for converting analog image data obtained by the CCD 42 functioning as an imaging element into digital image data The image data converted into digital image data by the data conversion unit 66 is inputted into the light source range discriminating means 54.

The light source range discriminating means 54 includes a without-IR image memory 68a for storing image data (without-IR image data) obtained without using the IR cut filter 62, a with-IR image memory 68b for storing image data (with-IR image data) obtained through the IR cut filter

62, an image comparing unit 70 for comparing the with-IR image data with the without-IR image data, and a light source kind discriminating unit 72 for discriminating the kind of a light source from a result of the image comparison.

The IR cut filter 62 provided between the photographing lens 60 and the CCD 42 is disposed so as to be freely put on and off the photographing optical axis by the filter driving means 64 constructed from a gear mechanism or the like. This construction makes it possible to freely obtain an image (with-IR image) obtained through the IR cut filter 62 and an image (without-IR image) obtained without using the IR cut filter 62.

For instance, prior to the actual photographing, there are obtained (pre-photographed) two kinds of images that are an image (with-IR image) obtained through the IR cut filter 62 and an image (without-IR image) obtained without using the IR cut filter 62 by putting the IR cut filter 62 on and off the photographing optical axis under a state where the shutter button is half-pressed. The with-IR image and the without-IR image are stored in the with-IR image memory 68$b$ and the without-IR image memory 68$a$, respectively.

The image comparing unit 70 compares the with-IR image with the without-IR image, thereby calculating a difference between these images. The light source kind discriminating unit 72 discriminates the kind of the light source based on the difference between the images.

A method of determining the light source range using the light source range discriminating means 54 will be described below.

First, the IR cut filter 62 is put on and off the photographing optical axis by operating a predetermined button or the like, thereby obtaining a with-IR image and a without-IR image for the same scene that should be photographed.

Each image data obtained by the CCD 42 is converted into digital image data by the data conversion unit 66, and the with-IR image and the without-IR image are stored in the with-IR image memory 68$b$ and the without-IR image memory 68$a$, respectively.

Next, in the image comparing unit 70, there is calculated a difference between the images obtained by the above operation.

When the with-IR image is referred to as R (x,y), G (x,y), and B (x,y), and the without-IR image is referred to as R' (x,y), G' (x,y), and B' (x,y), a difference $\Delta$ between these images is calculated from Expression (11) given below.

$$\Delta = \Sigma_{(x,y)}\{|R(x,y)-R'(x,y)|+|G(x,y)-G'(x,y)|+|B(x,y)-B'(x,y)|\}/3\Sigma_{(x,y)} \quad (11)$$

Here, the sum $\Sigma_{(x,y)}$ is obtained for every pixel (x,y).

That is, the difference A is an average of differences concerning R, G, and B for every pixel constituting the image.

By the way, a light source, such as tungsten, based on black-body radiation has a component in the infrared light region. However, a fluorescent lamp hardly has a component in the infrared light region. Accordingly, by utilizing this difference, it becomes possible to distinguish between a light source based on black-body radiation and a fluorescent lamp. That is, in the case of a light source based on black-body radiation, the infrared light component in the with-IR image obtained through the IR cut filter 62 is almost cut, so that there occurs a significant difference in the presence or absence of the infrared light component with respect to the without-IR image obtained without using the IR cut-filter 62. In contrast to this, in the case of a fluorescent lamp, inherently this lamp hardly has a component in the infrared light region, so that there occurs no significant difference between the with-IR image and the without-IR image.

In view of this fact, the with-IR image is compared with the without-IR image. In the case where the difference $\Delta$ between these images is greater than a predetermined value ka, the light source kind discriminating unit 72 determines that the currently used light source is a light source based on black-body radiation. Also, in the case where the difference $\Delta$ is equal to or smaller than the predetermined value ka, the light source kind discriminating unit 72 determines that the currently used light source is a fluorescent lamp. It is therefore possible to identify the kind of the light source in this manner.

In view of this fact, next, the image comparing unit 70 compares the difference $\Delta$ between the with-IR image and the without-IR image obtained from the same scene with the predetermined value ka.

In the case where the difference $\Delta$ is equal to or smaller than a predetermined value ka as a result of the comparison, the light source kind discriminating unit 72 determines that the kind of the currently used light source is a fluorescent lamp. Also, in the case where the difference $\Delta$ is greater than the predetermined value ka, the light source kind discriminating unit 72 determines that the kind of the currently used light source is a light source based on black-body radiation.

By doing so, it becomes possible to roughly identify the light source range, that is, to determine whether the currently used light source is a light source based on black-body radiation or a fluorescent lamp.

Figure 8:
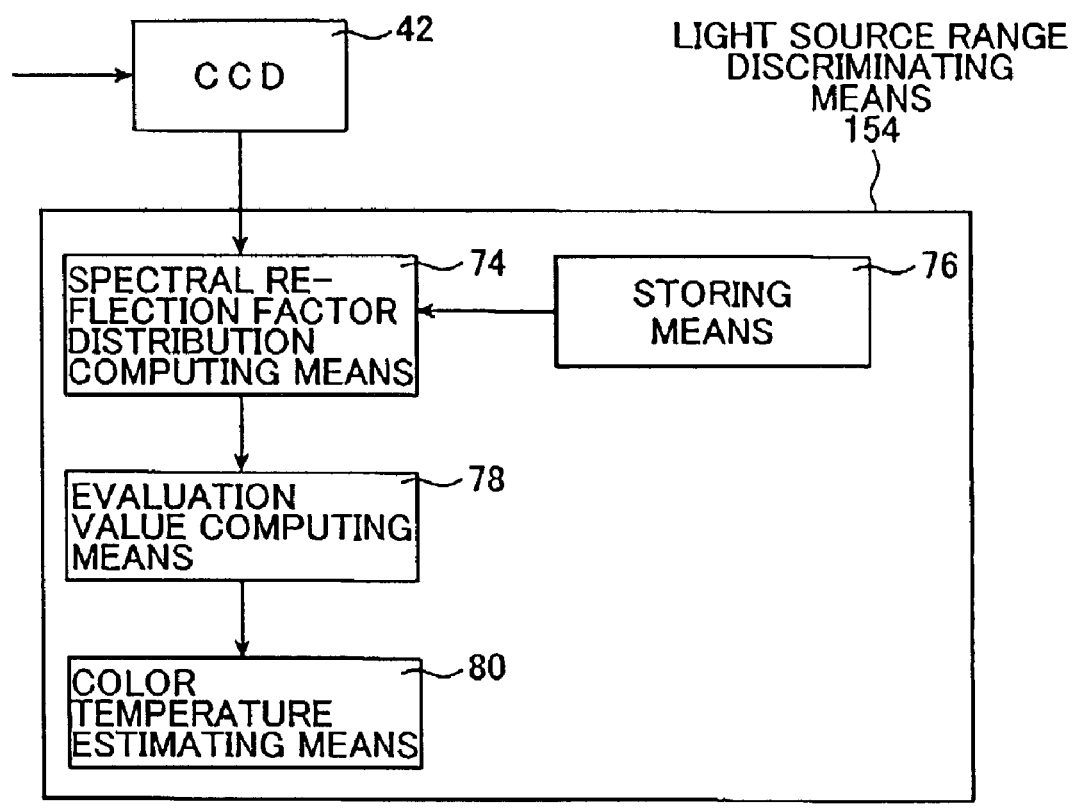
FIG. 8 is a block diagram showing an outline of a construction of another example of the light source range discriminating means in the embodiment of the present invention.

Also, FIG. 8 shows another example of the light source range discriminating means.

The light source range discriminating means 154 shown in FIG. 8 discriminates the light source range by estimating a color temperature of a light source. When actually discriminating the light source range, the light source range may be discriminated using either one of the aforementioned light source range discriminating means 54 shown in FIG. 7 and the light source range discriminating means 154 shown in FIG. 8. Alternatively, the light source range may be discriminated by combining both of these means. Needless to say, it becomes possible to further narrow the light source range in the case where both of the means are used.

The light source range discriminating means 154 shown in FIG. 8 includes a storing means 76 in which there is prestored a reference value determined by the product sum or integration value of a product of a spectral energy distribution of an object whose color temperature is already known, a spectral sensitivity distribution of a photometering system, and a spectral reflection factor distribution expressed by the primary coupling of predetermined three functions; a measuring means (CCD) 42 for measuring light from a photographing light source for the estimation of a color temperature; a spectral reflection factor distribution computing means 74 for computing a spectral reflection factor distribution realizing the minimum difference between the reference value and a measurement value for each color temperature; an evaluation value computing means 78 for calculating as an evaluation value the sum of abnormal components, in which the maximum value of the spectral reflection factor obtained by the above operation exceeds 1.0; and a color temperature estimating means 80 for estimating a color temperature corresponding to the minimum value of the evaluation value as a color temperature of a photographing light source whose color temperature is to be estimated.

First, there will be described the principle of a method of estimating a color temperature of a photographing light source by the present light source range discriminating means 154.

In general, the value of a sensor output in the case where there is photographed a subject illuminated by natural daylight with a color temperature T can be expressed by Expression (12) given below.

$$E_{ij}^T = \int P^T(\lambda)\rho_i(\lambda)S_j(\lambda)d\lambda \tag{12}$$

Here, $E_{ij}^T$ refers to a sensor output value, $P^T(\lambda)$ refers to a spectral energy distribution of black-body radiation with the color temperature T, $\rho_i(\lambda)$ refers to a spectral reflection factor distribution of the ith subject, and $S_j(\lambda)$ refers to the spectral sensitivity distribution of the jth sensor.

It should be noted here that as to the spectral sensitivity distribution $\rho_i(\lambda)$ of a subject in Expression (12) described above, there is determined "i" by an information form for obtaining data. That is, if it is assumed that a photographed image is obtained by the photographing of a subject, it is possible to obtain information from each pixel obtained by dividing the photographed image into many areas vertically and horizontally. Consequently, it is possible to consider that the spectral sensitivity distribution $\rho_i(\lambda)$ is a spectral reflection factor distribution $\rho_i(\lambda)$ of a subject corresponding to the ith pixel.

Also, as to the spectral sensitivity distribution $S_j(\lambda)$ of a sensor in Expression (12) described above, it is generally preferable that "j" is set at 3 so as to correspond to three primary colors (R, G, B). Also, this sensor spectral sensitivity distribution $S_j(\lambda)$ can be replaced with a spectral sensitivity distribution of a photographing film in the case where the present invention is applied to a photographing film, and can be replaced with a spectral sensitivity distribution of a sensor of an imaging apparatus in the case where the present invention is applied to an imaging apparatus such as a video camera.

In the case where there exists sensor output value data ($E^{ij0}$) recorded at an unknown color temperature $T^0$, if there is conceived the obtainment of a color temperature of a photographing light source that is used when the subject is photographed, its solution is a color temperature with which there is minimized a difference $\Delta E$ between data $E_{ij}^0$ and the sensor output value $E_{ij}^T$ as expressed by Expression (13) given below.

$$\Delta E = \sum_{i=1}^{n}\sum_{j=1}^{3}(E_{ij}^0 - E_{ij}^T)^2 \tag{13}$$

In order to perform computation for minimizing the difference $\Delta E$ in Expression (13) described above, it is required to formulate an unknown spectral reflection factor $\rho_i(\lambda)$. If $a_k^i$ refers to a weighting coefficient (unknown number) and $e_k(\lambda)$ refers to an inherent vector, it is known that it is possible to express this spectral reflection factor $\rho_i(\lambda)$ as the weighting sum of inherent vectors as expressed by Expression (14) given below.

$$\rho_i(\lambda) \approx \sum_{k=1}^{3} a_k^i \cdot e_k(\lambda) \tag{14}$$

Accordingly, it is possible to express Expression (12) described above as Expression (15) given below using Expression (14).

$$E_{ij}^T \approx \int P^T(\lambda)S_i(\lambda)\sum_{k=1}^{3} a_k^i \cdot e_k(\lambda)d\lambda \tag{15}$$

There occurs an unusual phenomenon where a spectral reflection factor, which is obtained in the case where a spectral reflection factor of a subject is restored from Expression (14) described above using the weighing coefficient $a_k^i$ giving the minimum value of $\Delta E$ at each color temperature, becomes a negative value or significantly exceeds 1.0. This may be because when an attempt is made to minimize the difference $\Delta E$, the spectral reflection factor $\rho_i(\lambda)$ becomes an abnormal value in order to eliminate contradiction that occurs during computation. Also, the spectral reflection factor has a relation of "$0 \leq \rho_i(\lambda) \leq 1$", so that this factor does not become a negative value or exceed 1.0. In view of these facts, it is possible to estimate the color temperature of a photographing light source using an abnormal spectral reflection factor.

That is, assuming that the color temperature is displaced from the "true color temperature" with a degree with which the spectral reflection factor $\rho_i(\lambda)$ exceeds 1.0, there is introduced an evaluation value V for color temperature estimation expressed by Expression (16) given below. Note that if a numerical value inside the parentheses "( )" in Expression (16) is negative, this value will be set at "0".

$$V = \sum_{i=1}^{n}(\max\{\rho_i(\lambda)\} - 1.0) \tag{16}$$

By plotting this evaluation value V with reference to a color temperature, there is obtained a characteristic having a V-letter shaped depression and matches a result of a model computation performed by giving a concrete value. In view of this fact, it is possible to estimate that a color temperature corresponding to the minimum value of the evaluation value V, which is the V-letter shaped depression described above, is a color temperature of a photographing light source.

Accordingly, by using this principle, with the light source range discriminating means 154 in FIG. 8, it becomes possible to discriminate the light source range through the estimation of the color temperature of a photographing light source in the manner described below.

There is obtained beforehand a reference value determined by the product sum or integration value of a product of a spectral energy distribution of an object whose color temperature is already known, a spectral sensitivity distribution of a photometering system such as an imaging system, and a spectral reflection factor distribution expressed by the primary coupling of predetermined three functions. This reference value is stored in the storage means 76. Here, as the spectral energy distribution of an object whose color temperature is already known, there are the spectral energy distribution of black-body radiation, the spectral energy distribution of a fluorescent lamp, an incandescent lamp, and the like.

On the other hand, light from the photographing light source is measured using the CCD 42, and the spectral reflection factor distribution computing means 74 obtains a spectral reflection factor distribution for each color temperature with which there is minimized the difference between the reference value and the measurement value.

Next, the evaluation value computing means 78 obtains a sum of other abnormal components, in which the maximum value of the spectral reflection factor obtained by the above operation exceeds 1.0, as the evaluation value V from Expression (16). Following this, finally, the color temperature estimating means 80 estimates that a color temperature corresponding to the minimum value of the evaluation value V described above is the color temperature of the photographing light source.

As described above, the light source range discriminating means 54 in FIG. 7 is capable of roughly discriminating the light source range, that is, determining whether the photographing light source is a light source based on black-body radiation or a fluorescent lamp, while the light source range discriminating means 154 in FIG. 8 is capable of discriminating the range of the photographing light source by estimating the color temperature of the photographing light source.

The determination of the light source range may be performed using either one of these two light source range discriminating means 54 and 154 or may be performed by using both of them in combination. By combining these light source range discriminating means, it becomes possible to further narrow the light source range.

Next, there will be described a method of determining the L-MTX.

The L-MTX determining means 56 shown in FIG. 6 that is used in this embodiment optimizes the L-MTX 44 within the light source range discriminated by the light source range discriminating means 54 (154) so that there is resolved the light source dependency of the C-MTX 50. In this embodiment, as this L-MTX determining means 56, there may be used the color correction matrix determining apparatus 10 shown in FIG. 1 or the color correction matrix determining apparatus 30 shown in FIG. 3.

First, there will be described a case where the color correction matrix determining apparatus 10 shown in FIG. 1 is used as the L-MTX determining means 56.

As described above, the color correction matrix determining apparatus 10 used as the L-MTX determining means 56 includes the light source-specific average color difference calculating means 18, the average color difference maximum value calculating means 22, the maximum value comparing means 24, and the L-MTX setting means 20.

The light source-specific average color difference calculating means 18 calculates an average color difference for each light source, which seems to be obtained in the case where an NCS chart is photographed under each light source within a light source range discriminated by the light source range discriminating means 54, using the light source range, prestored data concerning the NCS chart or the like, and a coefficient $\{L_{ij}\ (i, j=1\ to\ 3)\}$ of the L-MTX 44 set by the L-MTX setting means 20.

The average color difference maximum value calculating means 22 calculates the maximum difference among the average color differences for respective light sources calculated by the above operation using the NCS chart or the like.

The maximum value comparing means 24 minimizes the maximum value among the average color differences for respective light sources calculated by the above operation, and compares the newly calculated maximum value with the minimum value among previous maximum values. If it is found that the newly calculated maximum value is smaller than the minimum value as a result of the comparison, this maximum value is newly set as the minimum value among the maximum values. Following this, the L-MTX setting means 20 performs the setting of the L-MTX again. Then, the calculation of the average color difference for each light source and the calculation of the maximum value among the average color differences are performed, and the same operation as above is repeated. In this manner, the L-MTX is optimized by minimizing the maximum value of the average color differences.

In this manner, there is determined the L-MTX 44.

Next, as another example of the L-MTX determining means 56, there will be described a case where the color correction matrix determining apparatus 30 shown in FIG. 3 is used. This color correction matrix determining apparatus 30 shown in FIG. 3 that is used as the L-MTX determining means 56 optimizes the L-MTX by minimizing the average value of the average color differences for respective light sources.

As described above, the color correction matrix determining apparatus 30 used as the L-MTX determining means 56 includes the light source-specific average color difference calculating means 32, the average color difference average value calculating means 36, the average value comparing means 38, and the L-MTX setting means 34.

The L-MTX determining means using the color correction matrix determining apparatus 30 shown in FIG. 3 is the same as the aforementioned L-MTX determining means that uses the color correction matrix determining apparatus 10 in FIG. 1 except that the average value of the average color differences for respective light sources is used in place of the maximum value of the average color differences for respective light sources.

That is, the light source-specific average color difference calculating means 32 calculates the average color difference for each light source using the light source range discriminated by the light source range discriminating means 54, prestored data concerning the NCS chart, and the L-MTX set by the L-MTX determining means 34. Following this, the average color difference average value calculating means 36 calculates the average value of the average color differences for respective light sources, the average value comparing means 38 compares this average value with average values previously calculated, the L-MTX setting means 34 performs the setting of the L-MTX again, and the operation described above is repeated. In this manner, the L-MTX is optimized by minimizing the average value.

In order to minimize and determine the L-MTX 44 in this manner, it is possible to minimize the maximum value among the average color differences for respective light sources. Alternatively, it is possible to minimize the average value of the average color differences for respective light sources.

This point has been described above, so that the detailed explanation thereof will be omitted in the following description.

It should be noted here that the same description as above applies to the color reproduction error caused by the fixation of the C-MTX 50.

That is, tristimulus values X, Y, and Z obtained under a reference light source $P_0(\lambda)$ are approximated as expressed by Expression (1) described above through the linear coupling of an imaging system exposure amount obtained under a photographing light source $P(\lambda)$.

It should be noted here that the coefficient $C_{ij}$ is a coefficient of the C-MTX 50. Also, $r(\lambda)$, $g(\lambda)$, and $b(\lambda)$ are each imaging system spectral sensitivity stipulated by Expressions (2) to (4) described above using CCD spectral sensitivity R (λ), G (λ), and B (λ) and the coefficient L of the L-MTX 44.

As described above, the C-MTX 50 is determined by determining the coefficient $C_{ij}$ so that Expression (1) described above that is an approximate expression is well satisfied. In an actual device, the C-MTX 50 optimized for the reference light source (D55) using Expression (1) described above is used for every light source in a fixed manner and this fixation of the C-MTX 50 becomes a cause of the light source dependency. In view of this fact, the present invention has been made to resolve this light source dependency by appropriately selecting the L-MTX.

As described above, tristimulus values calculated from an exposure amount under a reference light source $P_0$ (λ) are referred to as X, Y, and Z and tristimulus values calculated from an exposure amount under a photographing light source P (λ) are referred to as X', Y', and Z' with reference to a subject spectral reflection factor h (λ), Δa* caused by the fixation of a color conversion coefficient can be evaluated using Expression (5) described above.

Also, in a like manner, Δb* caused by the fixation of the color conversion coefficient can be evaluated using Expression (6) described above.

Accordingly, by using an appropriate constant, the color reproduction error can be evaluated using Expression (7) described above.

By the way, in the case of a digital camera, there is usually provided an AE (auto-exposure) mechanism and brightness adjustment is performed using this mechanism, so that L* is substantially canceled. As a result, as to ΔE, it is enough to consider only Δa* and Δb* and ΔE is given from Expression (8) described above.

In this manner, it becomes possible to minimize a color difference ΔE by minimizing the right side of Expression (7) described above.

It should be noted here that as can be understood from Expression (7), this expression does not contain a subject h (λ) and it is not required to use data concerning a specific chart, such as the NCS chart, or the like, and it is possible to determine the L-MTX through optimization where there is minimized the right side of Expression (7) described above only with the data on the light source range.

In reality, as to the right side of Expression (7) described above, it is enough to determine the L-MTX described above by minimizing Expression (9) through the obtainment of the maximum value $\max_k$ among a plurality of light sources $P_k$.

Alternatively, the average value on the right side of Expression (7) described above may be minimized. The minimization of the average value on the right side is equivalent to the minimization of the sum concerning respective light sources $P_k$. Therefore, the L-MTX described above may be determined by minimizing the sum $\Sigma_k$ expressed by Expression (10) described above.

As described above, the light source range discriminating means 54 and the L-MTX determining means 56 are mounted in the image photographing apparatus 40, so that it becomes possible to discriminate the photographing light source range during photographing and to swiftly determine an optimum L-MTX corresponding to this light source range. As a result, even if the C-MTX 50 is fixed so as to correspond to a reference light source, it becomes possible to display an image with high quality on the monitor 52 without any dependence on the photographing light source.

In the case where photographing is actually performed using the image photographing apparatus 40, the image photographing apparatus 40 is directed toward a scene to be photographed prior to the photographing (during the photographing) in order to discriminate the photographing light source range. Following this, the L-MTX 44 is optimized and determined within the discriminated photographing light source range. Then, after an image is photographed, color conversion (color correction) is performed using the L-MTX 44 set through the optimization, the C-MTX 50, and the like. Finally, an image with high quality is displayed on the monitor 52.

Here, in the above description, the L-MTX 44 is determined through optimization and calculation as occasion demands. However, the L-MTX 44 optimized with respect to light sources within a predetermined range may be calculated in advance. In this case, the L-MTX 44 is stored and the switching of the L-MTX 44 is performed in accordance with the discriminated light source range.

As described above, with the technique of this embodiment, it becomes possible to determine a matrix (L-MTX) by utilizing a characteristic of the construction where there are provided two color correction matrixes, to resolve the light source dependency of an image photographing apparatus, to perform photographing without concern for the photographing light source even with a fixed C-MTX, and to obtain a display image with high quality for which white balance correction and color correction have been appropriately performed.

It should be noted here that in the above embodiments, a CCD is used as an imaging element, a subject is imaged using the CCD, and image data is inputted. However, the imaging element is not limited to the CCD. That is, it is possible to suitably use a CMOS, a photomultiplier, or the like in addition to the CCD.

Further, in addition to image data obtained through the imaging of a subject using an imaging element in this manner, the present invention is applicable to image data obtained through the recording of a printed original using a scanner. Also, in this case, it is assumed that "r", "g", and "b" in Expression (15) or (16) described above represent effective input spectral sensitivity.

The color correction matrix determining method and apparatus and image photographing method and apparatus according to the present invention have been described in detail above based on various embodiments. However, the present invention is not limited to the embodiments described above and, needless to say, it is possible to make various kinds of changes or modifications without departing from the gist of the present invention.

As described above, with the techniques of the first and second aspects of the present invention, it becomes possible to provide a matrix determining method that utilizes a characteristic of a construction where there are provided two color correction matrixes and to determine a first matrix so that there is resolved the light source dependency of a second matrix.

Also, as described above, with the techniques of the third and fourth aspects of the present invention, it becomes possible to obtain an image with high quality in which the light source dependency of an image photographing apparatus is resolved and white balance correction and color correction have been appropriately performed.

What is claimed is:

1. A color correction matrix determining method for determining a color correction matrix in a color processing system that converts input image data into output image data and includes two color correction matrixes that are a first matrix and a second matrix, with a white balance correction circuit being sandwiched between said first matrix and said second matrix, said color correction matrix determining method comprising:

inputting a light source range containing a plurality of light sources; and determining the first matrix based on said inputted light source range, wherein said inputting step is a step of inputting as said input image data photographed image data obtained by photographing the same subject under respective light sources of said plurality of light sources contained in said light source range, and said determining step is a step of determining the first matrix based on said inputted photographed image data under said respective light sources, and wherein said determining step further comprises:

calculating average color differences for said respective light sources from said photographed image data under said respective light sources; and determining said first matrix so that a maximum value among or an average value of said average color differences calculated for said respective light sources is minimized.

2. The color correction matrix determining method according to claim 1, wherein said first matrix is determined so that a maximum value among respective average color differences for light sources within said inputted light source range is minimized.

3. The color correction matrix determining method according to claim 1, wherein said first matrix is determined so that an average value of respective average color differences for light sources within said inputted light source range is minimized.

4. A color correction matrix determining method for determining a color correction matrix in a color processing system that converts input image data into output image data and includes two color correction matrixes that are a first matrix and a second matrix, with a white balance correction circuit being sandwiched between said first matrix and said second matrix, said color correction matrix determining method comprising:

inputting a light source range containing a plurality of light sources; and determining the first matrix based on said inputted light source range, wherein when said first matrix is referred to as $(L_{ij}(i, j=1$ to $3)\}$, a reference light source within said inputted light source range is referred to as $P_0$, one light source different from said reference light source within said light source range is referred to as $P_k$ (k represents a kind of light source), and each of r ($\lambda$), g ($\lambda$), and b ($\lambda$) represents effective input spectral sensitivity stipulated by the following expressions from input spectral sensitivity R ($\lambda$), G ($\lambda$), and B ($\lambda$) of said input image data and said first matrix $\{L_{ij}\}$, $r(\lambda)=L_{11}\cdot R(\lambda)+L_{12}\cdot G(\lambda)+L_{13}\cdot B(\lambda)$ $g(\lambda)=L_{21}\cdot R(\lambda)+L_{22}\cdot G(\lambda)+L_{23}\cdot B(\lambda)$ $b(\lambda)=L_{31}\cdot R(\lambda)+L_{32}\cdot G(\lambda)+L_{33}\cdot B(\lambda)$ said first matrix is determined so that the following expression is minimized, $\max_k\{|\log(P_k, r)/(P_0, r)-\log(P_k, g)/(P_0, g)|+|\log(P_k, g)/(P_0, g)-\log(P_k, b)/(P_0, b)|\}.$ 5. A color correction matrix determining method for determining a color correction matrix in a color processing system that converts input image data into output image data and includes two color correction matrixes that are a first matrix and a second matrix, with a white balance correction circuit being sandwiched between said first matrix and said second matrix, said color correction matrix determining method comprising:

inputting a light source range containing a plurality of light sources; and determining the first matrix based on said inputted light source range, wherein when said first matrix is referred to as $\{L_{i,j}(i, j=1$ to $3)\}$, a reference light source within said inputted light source range is referred to as $P_0$, one light source different from said reference light source within said light source range is referred to as $P_k$ (k represents a kind of light source), and each of r ($\lambda$), g ($\lambda$), and b ($\lambda$) represents effective input spectral sensitivity stipulated by the following expressions from input spectral sensitivity R ($\lambda$), G ($\lambda$), and B ($\lambda$) of said input image data and said first matrix $\{L_{ij}\}$, $r(\lambda)=L_{11}\cdot R(\lambda)+L_{12}\cdot G(\lambda)+L_{13}\cdot B(\lambda)$ $g(\lambda)=L_{21}R(\lambda)+L_{22}\cdot G(\lambda)+L_{23}\cdot B(\lambda)$ $b(\lambda)=L_{31}R(\lambda)+L_{32}\cdot G(\lambda)+L_{33}\cdot B(\lambda)$ said first matrix is determined so that the following expression is minimized, $\Sigma_k\{|\log(P_k, r)/(P_0, r)-\log(P_k, g)/(P_0, g)|+|\log(P_k, g)/(P_0, g)-\log(P_k, b)/(P_0, b)|\}.$ 6. A color correction matrix determining apparatus that determines a color correction matrix in a color processing system that converts input image data into output image data and includes at least two color correction matrixes that are a first matrix and a second matrix, with a white balance correction circuit being sandwiched between said first matrix and said second matrix, said color correction matrix determining apparatus comprising:

means for inputting a light source range containing a plurality of light sources; and means for determining said first matrix based on said inputted light source range, wherein said inputting means is means for inputting as said input image data photographed image data obtained by photographing the same subject under respective light sources of said plurality of light sources contained in said light source range, and said determining means is means for determining the first matrix based on said inputted photographed image data under said respective light sources, and wherein said determining means further comprises:

means for calculating average color differences for said respective light sources from said photographed image data under said respective light sources; and means for determining said first matrix so that a maximum value among or an average value of said average color differences calculated for said respective light sources is minimized.

7. The color correction matrix determining apparatus according to claim 6,
wherein said means for determining said first matrix based on said inputted light source range includes:
means for calculating respective average color differences for light sources within said inputted light source range;
means for calculating a maximum value among said respective average color differences; and
means for determining said first matrix so that maximum value among said respective average color differences is minimized.

8. The color correction matrix determining apparatus according to claim 6,
wherein said means for determining said first matrix based on said inputted light source range includes:
means for calculating respective average color differences for light sources within said inputted light source range;
means for calculating an average value of said respective average color differences; and
means for determining said first matrix so that said average value of said respective average color difference is minimized.

9. An image photographing method for converting input image data into output image data by using a color processing system and including at least two color correction matrixes that are a first matrix and a second matrix, with a white balance correction circuit being sandwiched between said first matrix and said second matrix,
said image photographing method comprising:
discriminating a photographing light source range containing a plurality of light sources; and
determining said first matrix based on said discriminated photographing light source range,
wherein said discriminating step comprises:
discriminating a light source type to which said photographing light source belongs; and
determining said plurality of light sources contained in said discriminated light source type, and
wherein said determining step of said first matrix comprises:
obtaining prestored photographed image data obtained by photographing the same subject under respective light sources of said plurality of determined light sources; and
determining said first matrix based on said obtained photographed image data under said respective light sources.

10. The image photographing method according to claim 9,
wherein said first matrix is determined so that a maximum value among respective average color differences for light sources within said discriminated photographing light source range is minimized.

11. The image photographing method according to claim 9,
wherein said first matrix is determined so that an average value of respective average color differences for light sources within said discriminated photographing light source range is minimized.

12. The image photographing method according to claim 9, wherein said determining step of said first matrix further comprises:
calculating an average color difference for said respective light sources from said obtained photographed image data under said respective light sources; and
determining said first matrix so that a maximum value among or an average value of said average color difference calculated for said respective light sources is minimized.

13. An image photographing method for converting input image data into output image data by using a color processing system and including at least two color correction matrixes that are a first matrix and a second matrix, with a white balance correction circuit being sandwiched between said first matrix and said second matrix,
said image photographing method comprising:
discriminating a photographing light source range containing a plurality of light sources; and
determining said first matrix based on said discriminated photographing light source range,
wherein said discriminating step of the photographing light source range is performed using at least one of the following two methods,
a method with which said photographing light source range is discriminated by obtaining image data of at least two images having different cutting degrees of an infrared light region from an identical subject, by performing comparison between said two images based on the obtained image data, and by determining said photographing light source range as fluorescent lamps Wit is found that a difference between said two images is smaller than a predetermined value as a result of the comparison and as light sources based on a black-body radiation if said difference between said two images is greater than said predetermined value, and
a method with which said photographing light source range is discriminated by obtaining a reference value that is determined by a product sum or integration value of a product of a spectral energy distribution of an object whose color temperature is already known, a spectral sensitivity distribution of a photometering system, and a spectral reflection factor distribution expressed by primary coupling of predetermined three functions, by measuring light from a photographing light source,
obtaining a spectral reflection factor distribution, with which a difference between the reference value and a measurement value is minimized, for each color temperature, by obtaining a sum of abnormal components, in each of which a maximum value of a spectral reflection factor in said obtained spectral reflection factor distribution exceeds 1.0, as an evaluation value, and by estimating a color temperature corresponding to a minimum value of said evaluation value as a color temperature of said photographing light source.

14. An image photographing method for converting input image data into output image data by using a color processing system and including at least two color correction matrixes that are a first matrix and a second matrix, with a white balance correction circuit being sandwiched between said first matrix and said second matrix,
said image photographing method comprising:
discriminating a photographing light source range containing a plurality of light sources; and
determining said first matrix based on said discriminated photographing light source range,
wherein when said first matrix is referred to as $\{Lid (i, j=1$ to $3)\}$, a reference light source within said discriminated photographing light source range is referred to as $P_0$, one light source different from said reference light source within said discriminated photographing light source range is referred to as $P_m$ (m represents a kind of light source), and each of r (λ), g (λ), and b (λ) represents effective input spectral sensitivity stipulated by the following expressions from input spectral sensitivity R (λ), G (λ), and B (λ) of said input image data and said first matrix $\{L_{ij}\}$, $r(\lambda)=L_{11}\cdot R(\lambda)+L_{12}\cdot G(\lambda)+L_{13}\cdot B(\lambda)$ $g(\lambda)=L_{21}\cdot R(\lambda)+L_{22}\cdot G(\lambda)+L_{23}\cdot B(\lambda)$ $b(\lambda)=L_{31}\cdot R(\lambda)+L_{32}\cdot G(\lambda)+L_{33}\cdot B(\lambda)$ said first matrix is determined so that the following expression is minimized, $\max_m\{|\log(P_m, r)/(P_0, r)-\log(P_m, g)/(P_0, g)|+|\log(P_m, g)/(P_0, g)|+|\log(P_m, g)/(P_0, g)-\log(P_m, b)/(P_0, b)|\}$.

15. An image photographing method for converting input image data into output image data by using a color processing system and including at least two color correction matrixes that are a first matrix and a second matrix, with a white balance correction circuit being sandwiched between said first matrix and said second matrix, said image photographing method comprising:
discriminating a photographing light source range containing a plurality of light sources; and
determining said first matrix based on said discriminated photographing light source range,
wherein when said first matrix is referred to as $\{L_{ij}(i, j=1$ to $3)\}$, a reference light source within said discriminated light source range is referred to as $P_0$, one light within said discriminated photographing light source range is referred to as $P_m$, (m represents a kind of the light source), and each of r (λ), g (λ), and b (λ) represents effective input spectral sensitivity stipulated by the following expressions from input spectral sensitivity R (λ), G (λ), and B (X) of said input image data and said first matrix $(L_{ij})$, $r(\lambda)=L_{11}\cdot R(\lambda)+L_{12}\cdot G(\lambda)+L_{13}\cdot B(\lambda)$ $g(\lambda)=L_{21}R(\lambda)+L_{22}\cdot G(\lambda)+L_{23}\cdot B(\lambda)$ $b(\lambda)=L_{31}R(\lambda)+L_{32}\cdot G(\lambda)+L_{33}\cdot B(\lambda)$ said first matrix is determined so that the following expression is minimized, $\Sigma_k\{|\log(P_m, r)/(P_0, r)-\log(P_m, g)/(P_0, g)|+|\log(P_m, g)/(P_0, g)-\log(P_m, b)/(P_0, b)|\}$.

16. An image photographing apparatus that includes a color processing system that converts input image data into output image data and includes at least two color correction matrixes that are a first matrix and a second matrix, with a white balance correction circuit being sandwiched between said first matrix and said second matrix, said image photographing apparatus comprising:
means for discriminating a photographing light source range containing a plurality of light sources; and
means for determining the first matrix based on said discriminated photographing light source range,
wherein said discriminating means comprises:
means for discriminating a light source type to which said photographing light source belongs; and
means for determining said plurality of light sources contained in said discriminated light source type, and
wherein said determining means of said first matrix comprises:

means for obtaining prestored photographed image data obtained by photographing the same subject under respective light sources of said plurality of determined light sources; and
means for determining said first matrix based on said obtained photographed image data under said respective light sources.

17. The image photographing apparatus according to claim 16, wherein said means for determining the first matrix based on the discriminated photographing light source range determines said first matrix so that a maximum value among respective average color differences for light sources within said discriminated photographing light source range is minimized.

18. The image photographing apparatus according to claim 16, wherein said means for determining the first matrix based on the discriminated photographing light source range determines said first matrix so that an average value of respective average color differences for light sources within said discriminated photographing light source range is minimized.

19. The image photographing apparatus according to claim 1, wherein said determining means of said first matrix further comprises:
means for calculating an average color difference for said respective light sources from said obtained photographed image data under said respective light sources; and
means for determining said first matrix so that a maximum value among or an average value of said average color difference calculated for said respective light sources is minimized.

20. An image photographing apparatus
that includes a color processing system that converts input image data into output image data and includes at least two color correction matrixes that are a first matrix and a second matrix, with a white balance correction circuit being sandwiched between said first matrix and said second matrix,
said image photographing apparatus comprising:
means for discriminating a photographing light source range containing a plurality of light sources; and
means for determining the first matrix based on said discriminated photographing light source range,
wherein said discriminating means of the photographing light source range has at least one of first and second photographing light source range discriminating means,
said first photographing light source range
discriminating means that includes: means for obtaining image data of at least two images having different cutting degrees of an infrared light region from an identical subject; means for performing comparison between said two images based on the obtained image data; and means for determining a type of photographing light sources based on a result of the comparison; and
said second photographing light source range
discriminating means that includes: storing means for storing in advance a reference value that is determined by a product sum or integration value of a product of a spectral energy distribution of an object whose color temperature is already known, a spectral sensitivity distribution of a photometering system, and a spectral reflection factor distribution expressed by primary coupling of predetermined three functions; measurement means for measuring light from a photographing light source; spectral reflection factor distribution computing means for computing a spectral reflection factor distribution, with which a difference between the reference value and a measurement value is minimized, for each color temperature; evaluation value computing means for computing a sum of abnormal components, in each of which a maximum value of a spectral reflection factor in said obtained spectral reelection factor in said obtained spectral reelection factor distribution exceeds 1.0, as an evaluation value; and means for estimating a color temperature corresponding to a minimum value of said evaluation value as a color temperature of said photographing light source.

* * * * *